US009828117B2

(12) United States Patent
Echelman et al.

(10) Patent No.: US 9,828,117 B2
(45) Date of Patent: Nov. 28, 2017

(54) TENSIONING APPARATUS AND SYSTEM FOR CLAMPING JOINTS

(71) Applicant: United Launch Alliance, L.L.C., Englewood, CO (US)

(72) Inventors: Philip M. Echelman, Denver, CO (US); Edwin W. Walton, Lafayette, CO (US)

(73) Assignee: UNITED LAUNCH ALLIANCE, L.L.C., Centennial, CO (US)

( * ) Notice: Subject to any disclaimer, the term of this patent is extended or adjusted under 35 U.S.C. 154(b) by 114 days.

(21) Appl. No.: 15/016,139

(22) Filed: Feb. 4, 2016

(65) Prior Publication Data
US 2017/0225808 A1 Aug. 10, 2017

(51) Int. Cl.
*B64G 1/00* (2006.01)
*B64G 1/64* (2006.01)
*F16B 7/04* (2006.01)

(52) U.S. Cl.
CPC ............. *B64G 1/645* (2013.01); *B64G 1/641* (2013.01); *F16B 7/0406* (2013.01)

(58) Field of Classification Search
CPC ........ B64G 1/222; B64G 1/641; B64G 1/645; B64G 1/002; B64G 1/00; B64G 1/1085; B64G 2001/643; F42B 15/38; F42B 3/04; F16B 7/0406; F16B 5/0012; F41F 3/04
See application file for complete search history.

(56) References Cited

U.S. PATENT DOCUMENTS

| 986,439 | A | | 3/1911 | Camp | |
|---|---|---|---|---|---|
| 1,375,111 | A | * | 4/1921 | Schmidt | F01D 5/3046 416/217 |
| 3,380,687 | A | * | 4/1968 | Ford | B64G 1/641 102/393 |
| 3,420,470 | A | * | 1/1969 | Meyer | B64G 1/641 102/378 |
| 4,100,710 | A | * | 7/1978 | Kowallik | E04C 2/292 403/353 |
| 4,506,852 | A | * | 3/1985 | Adams | B64G 1/14 124/16 |
| 5,125,601 | A | * | 6/1992 | Monford, Jr. | B64G 1/641 244/173.1 |
| 5,226,617 | A | * | 7/1993 | Panin | B64G 1/641 244/173.3 |
| 5,605,308 | A | * | 2/1997 | Quan | B64G 1/641 102/489 |

(Continued)

FOREIGN PATENT DOCUMENTS

FR 2619738 3/1989

OTHER PUBLICATIONS

"Marman Clamp System Design Guidelines," NASA Preferred Reliability Practices Guideline No. GDED-2214, 1998, 8 pages.

*Primary Examiner* — Medhat Badawi
(74) *Attorney, Agent, or Firm* — Sheridan Ross P.C.

(57) ABSTRACT

A new system and apparatus for detachably joining a first component to a second component is disclosed, along with a method for detachably joining two components. Embodiments of the present invention include a tensioning apparatus and system for clamping joints. The tensioning apparatus may include a wedge block and a fastening device. The clamping joint may be a tongue and groove joint that is tightened using the tensioning apparatus.

21 Claims, 16 Drawing Sheets

(56) References Cited

U.S. PATENT DOCUMENTS

| | | | | |
|---|---|---|---|---|
| 5,647,561 A * | 7/1997 | Robinson | B64G 1/641 | 220/320 |
| 5,743,492 A * | 4/1998 | Chan | B64F 1/04 | 102/274 |
| 6,533,221 B1 * | 3/2003 | Hubert | F42B 15/36 | 188/267 |
| 6,588,707 B1 * | 7/2003 | Hubert | B64G 1/641 | 244/173.2 |
| 6,695,261 B2 * | 2/2004 | Cleveland | B64G 1/002 | 244/171.7 |
| 7,437,857 B1 * | 10/2008 | Maguire | A45F 3/44 | 182/87 |
| 7,473,048 B2 * | 1/2009 | Nakamura | F16B 7/0406 | 403/143 |
| 7,922,125 B2 * | 4/2011 | Lancho Doncel | B64G 1/641 | 102/377 |
| 8,141,491 B1 * | 3/2012 | Travis | F42B 15/36 | 102/377 |
| 8,371,534 B1 * | 2/2013 | Goodzeit | B64G 1/66 | 188/378 |
| 8,720,830 B1 * | 5/2014 | Szatkowski | B64G 1/44 | 244/172.6 |
| 8,727,654 B2 * | 5/2014 | Graham | F16B 1/00 | 102/378 |
| 8,732,916 B2 | 5/2014 | Simons et al. | | |
| 9,234,351 B1 * | 1/2016 | Echelman | E04C 5/00 | |
| 2003/0006341 A1 * | 1/2003 | Buder | B64G 1/641 | 244/118.1 |
| 2004/0128934 A1 * | 7/2004 | Hecht | E04F 15/02 | 52/578 |
| 2004/0156673 A1 * | 8/2004 | Huessler | B64G 1/641 | 403/290 |
| 2006/0171776 A1 * | 8/2006 | Luft | F16B 7/0406 | 403/267 |
| 2009/0243169 A1 * | 10/2009 | Hadden | F16F 15/0232 | 267/122 |
| 2011/0273790 A1 * | 11/2011 | Aliev | B64G 1/222 | 359/846 |
| 2012/0012711 A1 * | 1/2012 | Ross | B64G 1/641 | 244/158.2 |
| 2012/0104177 A1 * | 5/2012 | Choi | B64G 1/222 | 244/173.3 |
| 2012/0112010 A1 * | 5/2012 | Young | B64G 1/641 | 244/173.1 |
| 2012/0261515 A1 * | 10/2012 | Smith | B64G 1/002 | 244/173.3 |
| 2012/0317753 A1 * | 12/2012 | Simons | B64G 1/641 | 24/19 |
| 2013/0206957 A1 * | 8/2013 | Kalman | F16D 3/18 | 248/660 |
| 2013/0221163 A1 * | 8/2013 | Barber | B64G 1/641 | 244/173.1 |
| 2013/0233161 A1 * | 9/2013 | Kametz | F42B 15/38 | 89/1.14 |
| 2014/0084113 A1 * | 3/2014 | Barber | B64G 1/641 | 244/173.2 |
| 2014/0291451 A1 * | 10/2014 | Guinot | B64G 1/222 | 244/172.6 |
| 2014/0332632 A1 * | 11/2014 | Helmer | B64G 1/641 | 244/173.2 |
| 2015/0097085 A1 * | 4/2015 | Holemans | B64G 1/641 | 244/173.1 |
| 2015/0102011 A1 * | 4/2015 | Varvara | F16B 7/0406 | 216/67 |
| 2015/0159587 A1 * | 6/2015 | Facciano | F02K 9/76 | 60/250 |
| 2015/0266594 A1 * | 9/2015 | Hu | B64G 1/34 | 244/167 |
| 2016/0257433 A1 * | 9/2016 | Wallinger | B64G 1/10 | |
| 2017/0074444 A1 * | 3/2017 | Nezu | F16B 7/04 | |

* cited by examiner

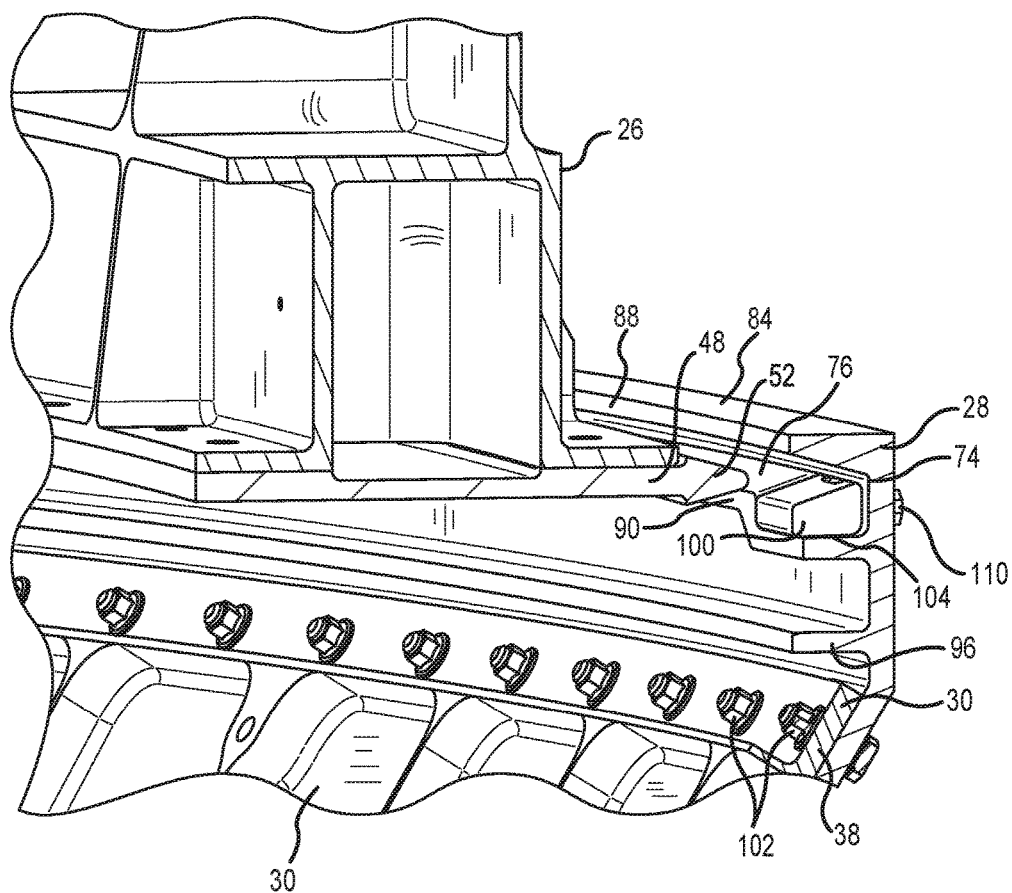
FIG.8A
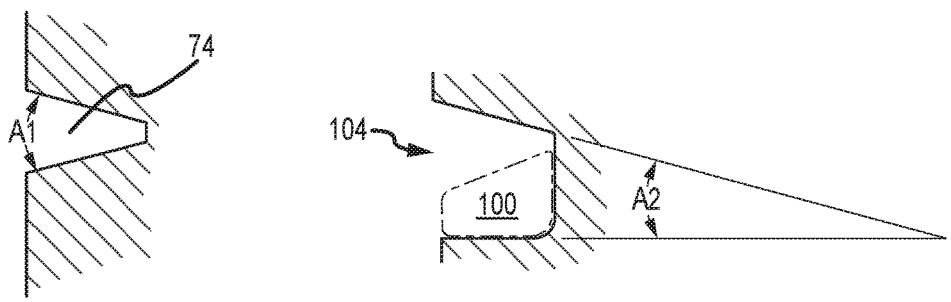
FIG.8B
FIG.8C

TENSIONING APPARATUS AND SYSTEM FOR CLAMPING JOINTS

FIELD OF THE INVENTION

Embodiments of the present invention generally relate to interconnection systems and clamping joints for detachably joining a first component to a second component, and more specifically to a tongue and groove clamping joint and tensioning system with wedge blocks for releasably interconnecting two components.

BACKGROUND OF THE INVENTION

Previous attempts have been made to manufacture reliable interfaces for interconnection and separation systems between two adjoining components experiencing high loads and separation shocks. Such adjoining components may be found in, for example, fluid pipe systems, machines, or vehicles, including aerospace systems such as launch vehicles, launch vehicle payloads, and payload fairings.

A launch vehicle is used to launch a payload into orbit around the earth or toward a path outside of earth's orbit. The payload needs protection from the atmosphere at launch because the high temperatures and pressures created may damage a sensitive payload. A fairing (also referred to as a payload fairing or a launch vehicle adapter ("LVA") fairing) is typically used to protect the payload or other portions of the upper stage before and during launch. A payload fairing surrounds the payload in the nose portion of the launch vehicle and a LVA fairing typically surrounds a portion of the spacecraft aft of the LVA or upper stage. The term "fairing" is used herein to reference all types of fairings. The fairing is detachably mounted to the upper stage of the launch vehicle. Once the rocket leaves earth's atmosphere, the fairing is separated from the launch vehicle and discarded to eliminate weight and prepare for separation of the payload.

Generally, in spacecraft launch vehicles, separation bolts secure at least the lower perimeter edge of a fairing to a separation ring, proximal to a horizontal separation plane, and may also interconnect edges of adjacent fairings, or the vertical separation plane(s). The separation bolts are spaced around the separation ring or on the edges of the fairings along the vertical separation plane(s) and include controlled charges. At the appropriate time, the charges are detonated to break the bolts and separate the fairings from the launch vehicle upper stage and/or from one another. However, shock waves and vibration are generated by these controlled charges as well as by the physical separation of the component pieces and disseminate through the body of the spacecraft. Shock waves and vibration (i.e., dynamic environments) can damage the payload.

Prior art fairing interconnection and separation systems use a variety of structures including a frangible joint at the base of the fairing ring, separation bolts and hinges, or a tongue and groove joint to reduce fairing dynamic environment generation due to separation and potentially reduce potential damage to the payload. Regarding such tongue and groove joints, the tongue is generally formed on the inner surface of the fairing, skirt, or the payload attach fitting ("PAF") base ring or the outer surface of a closeout plate and the groove is typically formed in a separation ring, a fairing forward ring, an aft ring frame, the aft frame or between a tension cleat and other component. Some prior art systems use what is known as a single-taper tongue and groove joint. An example of one such joint is illustrated in FIG. 1, which shows the interface between an aft ring frame and a 1575-4 PAF as used with a Delta 4 launch vehicle. The exterior of the launch vehicle (also called outboard side of launch vehicle) is shown on the left of FIG. 1 and the interior of the launch vehicle (also called inboard side of launch vehicle) is shown on the right of FIG. 1. Here, the separation ring with the groove is part of the fairing/fairing aft ring frame. As illustrated, the bottom surface of the groove and the bottom surface of the tongue are non-tapered (horizontally oriented as shown, such as in launch configuration) and the upper surface of the groove and tongue are oriented at an angle relative to the horizontal. The upper surfaces of the groove and tongue are the tapered surfaces. During fairing separation, the non-tapered side of the tongue will drag along the adjacent non-tapered side of the groove until the tongue fully clears the groove. The continuing contact between the tongue and groove prolongs and continues generation of separation dynamic environments. As also shown in FIG. 1, some prior art clamping joints use tension bolts to reduce the gap between one component (e.g., the tongue on the PAF base ring) and the other component (e.g., the groove in the aft ring frame). Tension bolts are typically vertically oriented as shown, when the spacecraft is in launch configuration, and are used to reduce the gap distance between the tongue and the groove. Tension bolts are a primary source of the payload fairing ("PLF") separation shock. Tension bolts also tend to gouge the PAF ring upon separation, which creates additional vibrations.

Other systems have implemented a minimal dual-taper tongue and groove joint, but the benefit of a minimal dual-taper is also relatively small. An example is illustrated in FIG. 2, where the joint is shown in the assembled position and the jettisoned (separated) position. The exterior of the launch vehicle is shown on the left of FIG. 2 and the interior of the launch vehicle is shown on the right of FIG. 2. The joint comprises a dual-tapered tongue 2 and a dual-taper groove 4, but the taper of the upper surfaces of the tongue 2 and groove 4 are nearly horizontal (at about a 5 degree angle) and the tapers of the lower surfaces are relatively horizontal (again, horizontal relative to the launch configuration). The groove 4 is formed on the interior surface of a skirt or fairing (also called a payload fairing or PLF) 8 and is also formed by an adjustable tension cleat 10. The fairing 8 has an inner skin panel 12 that interfaces closely to the miniskirt 6 to minimize the radial gap between the fairing 8 and PAF ring. However, there is no shimming or radial adjustment between the faces of these parts; rather, adjacent parts are sized to maintain a close fit. The tongue 2 is formed on the PAF ring, which also includes a miniskirt (also called a vertical leg) 6. The PAF ring is part of the launch vehicle upper stage. The miniskirt 6 is where the fairing 8 attaches. Here, the PAF ring is stationary and the fairing separation ring is jettisoned radially away from the PAF ring. The angled or tapered surfaces of both the tongue 2 and groove 4 will experience a growing or increasing separation distance as the groove 4 separates laterally or radially from the tongue 2 (based upon the orientation shown in FIG. 2). However, the benefit in terms of reducing shock or vibration is de minimus given the modest angle of the taper. At best, the minimal taper of the upper surfaces of the tongue 2 and the groove 4 minimally reduces the likelihood of contact during separation and generation of shock, vibration events, and/or dynamic environments.

Alternative interconnection and separation systems may use a Marman clamp band (also called a V-band clamp), which has a tongue and groove joint with tapered interfaces that "grow toward" one another such that no clearances exist between the tongue and groove when installed. Additionally, the flexible band and tensioning bolts used with the Marman clamp band require significant hoop preload, which increases shock during separation. Marman clamps are described in *Marman Clamp System Design Guidelines*, NASA Preferred Reliability Practices Guideline No. GDED-2214 (hereinafter, "NASA Guidelines"), which is incorporated by reference herein in its entirety. As noted in the NASA Guidelines, structural failure of Marman clamps are known to have occurred and extreme care is urged in designing such equipment.

Other disadvantages of the prior art structures, including the above systems, relate to accessibility and adjustability. The tensioning mechanisms of FIGS. 1 and 2 are located at the aft end of the aft ring and are generally accessible at that location. However, access is specifically an issue when fairings utilize a tongue and groove interface at the forward end of the fairings because the forward fairing separation ring is not accessible without internal fairing access. Also special tools are often required with these prior art systems, which compound access problems and increase expense, in addition to increased labor costs. For example, referring again to FIG. 1, there are generally between 100 and 150 tension bolts used in such separation designs. It can also be difficult and time consuming to shim, tighten, or torque a large number of tension bolts considering such activities require access between the tension bolts and the PAF base ring and forward skirt.

SUMMARY OF THE INVENTION

This invention relates to a novel system, device, and method for providing a detachable clamping joint used to interconnect and then separate two components. The novel apparatus and system allow two portions of a spacecraft, or other vehicle, machine, or pipe, to be interconnected at one point in time and subsequently disconnected at another point in time such that the separation shock during disconnection is reduced compared to prior art systems.

Typically, fairings (also called fairing halves if two are used) are secured to the launch vehicle at the horizontal separation plane parallel to the spacecraft separation plane and are secured to one another along a fairing vertical separation plane. Either or both of these connections may use separation bolts. In some embodiments, no separation bolts are used, for example one launch vehicle uses two separation nuts and a thrusting separation rail. Because of heavy loads experienced by the fairings, the surfaces of the fairings between the separation bolt fittings at the vertical separation plane preferably have a zero gap at installation. Without gap removal, this would create a condition where relative movement of the fairing during ascent is likely to cause a premature failure of the separation bolt or fastening device due to large displacements across the separation plane that can break the bolt or fastening device.

Additionally, the separation ring is comprised of two halves and these two halves are joined together at the vertical separation plane. A zero gap fit (in the vertical direction) between the separation ring halves is recommended for strength purposes. The zero gap between the separation ring halves thus requires clearances be designed into the tongue and groove interface to allow all of the parts to fit together, but nonetheless achieve the zero gap. These clearances also ensure that the tongue is always smaller than the groove such that the tongue can fit into the groove. Because every part is not perfectly machined, there will be gaps or clearances between the tongue and the groove. These gaps or clearances cause the parts to rattle during take-off and during flight. Accordingly, a wedge block tensioning system according to embodiments of the present invention was designed to remove or at least substantially reduce the small gaps or clearances between the tongue and the groove.

Spacecrafts are subjected to a broad range of potentially damaging environmental conditions during flight, including shock and vibration. Other than the launch itself, two significant sources of shock to the spacecraft payload occur during fairing separation and payload separation. Traditionally, a mechanical shock attenuation device, such as a shock ring, is positioned between the fairing and the payload attachment hardware. Although the shock rings employed in prior art were thought to reduce the shock to the payload, they actually offer little to no benefit, are operationally fragile, are cumbersome to install, and add weight to the launch vehicle. In addition, despite its attenuation characteristics, these shock attenuation devices retain a direct path for shock transmission to the launch vehicle, including the payload or spacecraft. Further, because modern spacecraft have more highly-sensitive components than previous generations of spacecraft, it remains an objective to reduce shock and vibration resulting from separation events.

Thus, it is one aspect of embodiments of the present invention to provide a clamping joint for interconnecting two components that reduces the separation shock when the two components separate from one another. In one embodiment, the clamping joint includes a tensioning apparatus to securely interconnect the two components, namely, multiple fairings and the launch vehicle. Additional embodiments include clamping joints for payload fairings ("PLFs") that are designed to reduce separation shock when the PLFs separate.

It is one aspect of embodiments of the present invention to provide an interconnection mechanism that does not use vertically-oriented (relative to the launch configuration) tensioning bolts that frictionally engage the tongue (e.g., push on the tongue portion) to reduce the gap between the tongue and groove. As is shown in FIG. 1 and described above, these tension bolts can be difficult to access when used in other locations and gouge components during separation creating additional shock and vibration. As such, embodiments of the present invention do not have the access difficulties created by hard-to-get-to tension bolts of the prior art and the separation shock/vibration is reduced because at least one source of separation shock and vibration (i.e., the tension bolts) is removed as compared to prior art designs. Further embodiments include a continuous tongue and groove interface, at least on the forward surface, to minimize or eliminate gouging during separation, reduce shock, and reduce foreign object debris ("FOD") generation.

Another aspect of various embodiments of the present invention is to provide an interconnection system that does not require access to an interior interface of the tongue and groove joint. Various embodiments of the present interconnecting system include a dual-taper tongue and groove joint with a plurality of discrete wedge blocks. In one embodiment, the tongue and groove joint includes a plurality of wedge blocks that are adjustably positioned from the exterior of the fairing. In a further embodiment, the head of a bolt fits into a slot in the wedge block and the bolt shaft extends outwardly through the fairing or separation ring (also called a fairing forward ring herein) such that the bolt can be tightened or loosened from the exterior of the fairing.

Scraping and sliding between the tongue and groove interface is another source of separation shock. To reduce shock, a dual tapered tongue and groove joint is preferred.

Prior art designs of tapered or angled tongue and groove joints use low taper angles, typically less than 10 degrees, which do not appreciably reduce scraping and sliding, thereby maintaining shock generation at high levels. In one embodiment of the present invention, the groove forms a 30 degree opening along its length and has discrete sections spaced along the length of the groove, each having a 15 degree opening. The angle of the tongue is also 30 degrees (e.g., in one embodiment, the upper surface of the tongue is at a 15 degree angle and the lower surface of the tongue is at a 15 degree angle such that the two surfaces form a 30 degree angle). A 15 degree wedge block is inserted at each discrete section to create a 30 degree opening and accommodate the tongue's 30 degree angle. The wedge block combines with the tongue to generally fill the groove of these discrete locations. By utilizing a wider angle for the groove, where neither of the surfaces is essentially horizontal relative to the launch configuration, upon separation of the tongue from the groove the likelihood of recontact between the tongue and groove is meaningfully reduced. In this manner the gap between both surfaces of the tongue and the adjacent surfaces of the groove will grow or increase as the groove moves laterally or radially away from the tongue. Thus, with little lateral movement a significant gap is created that will increase in size upon further lateral separation. Accordingly, the tongue is released from the groove with little to no scraping, sliding, or additional shock or vibration. It should be appreciated that these angles are approximate and may vary. Generally speaking, the smaller the angle the more likely the tongue will bind in the groove. However, a larger angle increases not only the thickness or height of the tongue and grove, but adds weight to the launch vehicle. In one embodiment, the angle of the groove is between about 15 degrees and about 45 degrees. In a preferred embodiment, the angle of the groove is between about 25 degrees and about 35 degrees. In a more preferred embodiment, the angle of the groove is about 30 degrees. In one embodiment, the angle of the groove at each discrete section is between about 5 degrees and about 40 degrees. In a more preferred embodiment, the angle of the groove at each discrete section is between about 10 degrees and about 25 degrees. In the most preferred embodiment, the angle of the groove at each discrete section is about 15 degrees.

Another source of vibration and shock in prior art systems is caused by the tongue and groove clearances during ascent, but prior to separation, due to the fairing rattling and moving up and down and side to side. This rattling can also create an acoustic environment (i.e., "ringing the bell") by rattling and ringing the fairing skin panels. Accordingly, embodiments of the present invention reduce this vibration and shock by reducing and minimizing clearances in the tongue and groove joint. Additionally, joints with high preload experience high separation shock because during the release of the joint, the high strain on the items is released in the form of a shock. Further, low clearances normally correlate to high pre-load. Thus, it is one aspect of embodiments of the present invention to provide a tongue and groove joint with low radial and axial clearances between the tongue and the groove, while maintaining low to no preload within the tongue and groove the joint. Prior art joints or interconnection systems have limited to no ability to remove the radial clearances between the tongue and the groove. Thus, it is one aspect of embodiments of the present invention to provide a joint or interconnection system that can remove or reduce the radial clearance between the tongue and the groove. In various embodiments, a tongue and groove clamping joint is provided that uses wedge blocks to remove radial clearances, in addition to axial clearances, between the tongue and the groove. In further embodiments, axial and radial clearances can be removed with one adjustment: adjustment of the wedge block relative to the tongue. The radial and axial clearances are reduced through the use of wedge blocks that have upper and lower surfaces oriented at angles that compliment the tongue and groove taper angles.

In various embodiments, a detachable clamping joint is provided with a tongue, a groove to receive the tongue, and wedge blocks that fit into complimentary-shaped pockets formed into the groove (also called the tongue groove herein) at spaced intervals. The wedge interfaces with the tongue on either the upper or lower surface of the tongue. The clamping joint further includes means to reposition each wedge block relative to the tongue. In a preferred embodiment, one end of a bolt is interconnected to the wedge block and the opposite end of the bolt extends through the fairing to the exterior of the spacecraft. In one embodiment, the bolts are similar to HI-LOK™ pins. In alternative embodiments, HI-LOK™ pins are used instead of bolts with washers and nuts because HI-LOK™ pins are commercially available parts that require no additional design or manufacturing and often require less parts, making them lighter weight than bolts, washers, and nuts. A nut is threaded onto the portion of the bolt on the exterior of the fairing. Adjustment of the bolt relative to the nut and fairing pulls the wedge block radially inward or outward within the wedge block pocket. The nuts are tightened against the fairing to keep the bolts and wedge blocks in position. After the tongue is positioned in the groove, the nuts are held stationary using a wrench and the bolts are rotated such that the head of the bolt pushes the wedge radially inwardly toward the center of the launch vehicle and into contact with the tongue. In one embodiment, the end of the bolt is configured to receive a key or similar tool for the purposes of rotating the bolt. Because the wedge block and tongue interface along inclined or angled surfaces, radially inward movement of the wedge block reduces and ultimately eliminates any gap between the tongue and the groove at the location of the wedge block while maintaining a dual tapered interface. Once the wedge blocks are properly positioned relative to the tongue, the nuts are tightened against the fairing to lock the radial position of the bolts and wedge blocks.

Further, the tolerances for dual-taper tongue and groove joints are higher than the tolerances for single-taper tongue and groove joints or lower-angled dual-taper tongue and groove joints. This is because of manufacturability and geometry. Specifically, it is easier to machine a flat surface than it is to machine a part with two tapers, as dual tapered parts (i.e., the tongue and the groove) each have their own tolerances. In one embodiment, the tapered surfaces of the tongue and the groove are dimensioned at a nominal line-to-line fit and are allowed to deviate away from that virtual condition. Furthermore, since both sets of surfaces are tapered (meaning both surfaces of the parts creating the tongue and groove joint), these angles increase both radial and axial clearances simultaneously.

Another aspect of various embodiments of the present invention is to provide a detachable clamping joint that is lightweight. Thus, in one embodiment, the clamping joint includes wedge blocks that do not extend continuously around the entire circumference of the joint (which may also be the circumference of the launch vehicle in some embodiments), which reduces the weight of the joint. In additional or alternative embodiments, the tongue portion does not extend continuously around the entire circumference of the joint, which also reduces the weight of the system. In various embodiments, the tongue around the perimeter of the plate has an arrowhead shape to further reduce the weight of the joint. In one embodiment, the tongue and groove system using wedge blocks only adds about two pounds to the fairing design, when the inside diameter of the fairing is about 180 inches.

One aspect of various embodiments is to provide a joint system that is relatively simple and does not have complex parts or a complicated compilation of parts. For example, some prior art systems include eccentric bushings for adjusting the height of the tongue or the groove. Embodiments of the present invention do not include eccentric bushings. Additionally, embodiments of the present invention include fewer parts than prior art tongue and groove joints. For example, prior art tongue and groove joints used to interconnect spacecraft fairings typically used between about 100 and 150 tension bolts to position the tongue and reduce the clearance between the tongue and groove. Thus, the lower surface of the tongue was in contact with the end of the bolt rather than the lower surface of the groove. Even though numerous tension bolts are used, this prior art design has little contact area between the tongue and the groove. In one specific prior art system, the contact area is about 9 in$^2$, where the contact area is the contact between the bolt end and the tongue. In contrast, some embodiments of the present invention include only 24 wedges, which create about 10.6 in$^2$ of contact area. Thus, significantly fewer wedge blocks are required to get the same area as in prior art systems. Using only 24 wedges and 24 corresponding bolts reduces the number of parts in the joint system and reduces the weight of the joint. Further, the parts of the present system have simpler geometries and are easier to manufacture.

The present invention also includes methods of securing and tightening a clamping joint. In one embodiment of the present invention, a method of securing and tightening a joint is provided comprising: providing a separation ring with a dual-tapered tongue groove, a plurality of wedge block cutouts spaced along the tongue groove, and a bore formed through the separation ring at the location of each wedge block cutout; an equal number of wedge blocks as wedge block cutouts, each wedge block having a bolt cutout in the upper portion of the wedge block; a custom bolt with a head on one end, a cylindrical body portion (sometimes called the "shank"), and a recess in the bolt's second end opposite the head; a washer; a nut; and a plate or an LVA ring with a tongue formed on a perimeter edge. Next, each bolt head is inserted into a bolt cutout in a wedge block and the cylindrical body portion of each bolt is inserted into each bore in the separation ring to position each wedge block into each wedge block cutout. A washer is positioned around the cylindrical body portion of the bolt on the exterior of the fairing separation ring; a nut is positioned on the cylindrical body portion of the bolt; and the nut is tightened until the nut and the washer abut the outer surface of the separation ring and, preferably, each wedge block is located at the radially outward most position to provide clearance between the tongue and wedge blocks during the following installation. Next, the method includes inserting the tongue into the tongue groove such that a upper surface of the tongue is resting on the upper surface of the tongue groove and the separation rings are mated and secured by torquing a separation bolt at the vertical separation plane; moving the wedge block radially inwardly by holding the nut in a stationary position (possibly with a wrench); inserting a tool (e.g., an Allen wrench or other wrench) into the recess of the bolt; turning the tool to turn the bolt relative to the nut; as the bolt rotates, moving the bolt inwardly and pushing the wedge block inwardly; frictionally securing the upper surface of the tongue against the upper surface of the tongue groove; providing radial pressure on the wedge block using the bolt; and providing radial pressure and an upward force on the tongue using the wedge block. Appropriate torquing values for the bolt may be selected to achieve the desired pressures and forces.

For purposes of further disclosure, the following references generally relate to devices and systems to join or clamp together two components under high loads and/or shock and are hereby incorporated by reference in their entireties:

U.S. Pat. No. 8,732,916 issued to Simons et al. on May 27, 2014, which discloses detachably joining a first component and a second component using a tensioning device, a plurality of brackets, and a band clamp to cause a plurality of shoes to engage an abutting cylindrical flange of each of the first component and the second component;

U.S. Pat. No. 6,695,261 issued to Cleveland on Feb. 4, 2004, which discloses a shock isolation system for spacecraft fairings that retains clearances in the clamping joint and uses opposing magnets to levitate the fairings during separation;

French Patent No. FR 2,619,738 to Dupin Gerard, entitled "Method for Producing a Separation in a Part with the Aid of a Pyrotechnic Casing which Can Expand," discloses a method for producing separation along a predetermined line of a part used in the aerospace field. The method further includes weakening devices formed from the part's material and formed along the separation line and a pyrotechnic casing positioned proximate to the weakening devices; and U.S. Patent Publication No. 2004/0128934 to Hecht published on Jul. 8, 2004.

For purposes of further disclosure, the following references, which are generally related to tongue and groove interconnections or joints, are hereby incorporated by reference in their entireties:

U.S. Pat. No. 986,439 issued to Camp on Mar. 14, 1911;
U.S. Pat. No. 1,375,111 issued to Schmidt on Apr. 19, 1921; and
U.S. Pat. No. 4,100,710 issued to Kowallik on Jul. 18, 1978.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

The Summary of the Invention is neither intended nor should it be construed as being representative of the full extent and scope of the present disclosure. The present disclosure is set forth in various levels of detail in the Summary as well as in the attached drawings and the Detailed Description and no limitation as to the scope of the claimed subject matter is intended by either the inclusion or non-inclusion of elements, components, etc. in this Summary. Moreover, reference made herein to "the present invention" or aspects thereof should be understood to mean certain embodiments of the present disclosure and should not necessarily be construed as limiting all embodiments to a particular description.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of the invention.

FIG. 8A is a partially exploded, cross-sectional view of one embodiment of a clamping joint taken along line 8-8 on FIG. 5;

FIG. 8B is a cross-sectional view of the tongue groove;

FIG. 8C is a cross-sectional view of the wedge block cutout;

In certain instances, details that are not necessary for an understanding of the disclosure or that render other details difficult to perceive may have been omitted from the drawings. It should also be understood that in some instances, details may have been added, such as details relating to methods of construction, including for example construction lines and dimensions, to assist in explaining the methods and structures of the preferred embodiments described herein. It should be understood, of course, that the claimed invention is not necessarily limited to the particular embodiments illustrated herein.

DETAILED DESCRIPTION

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

Although many of the figures show a spacecraft and components thereof, the present invention is not limited to spacecraft. Embodiments of the present invention can, for example, be used with pipes, aircraft, terrestrial vehicles such as watercraft and land vehicles, or any other situation where two components are interconnected together and the interconnection experiences high loads or high pressures, regardless of whether the component pieces are to remain connected or are to be separable.

Figure 1:
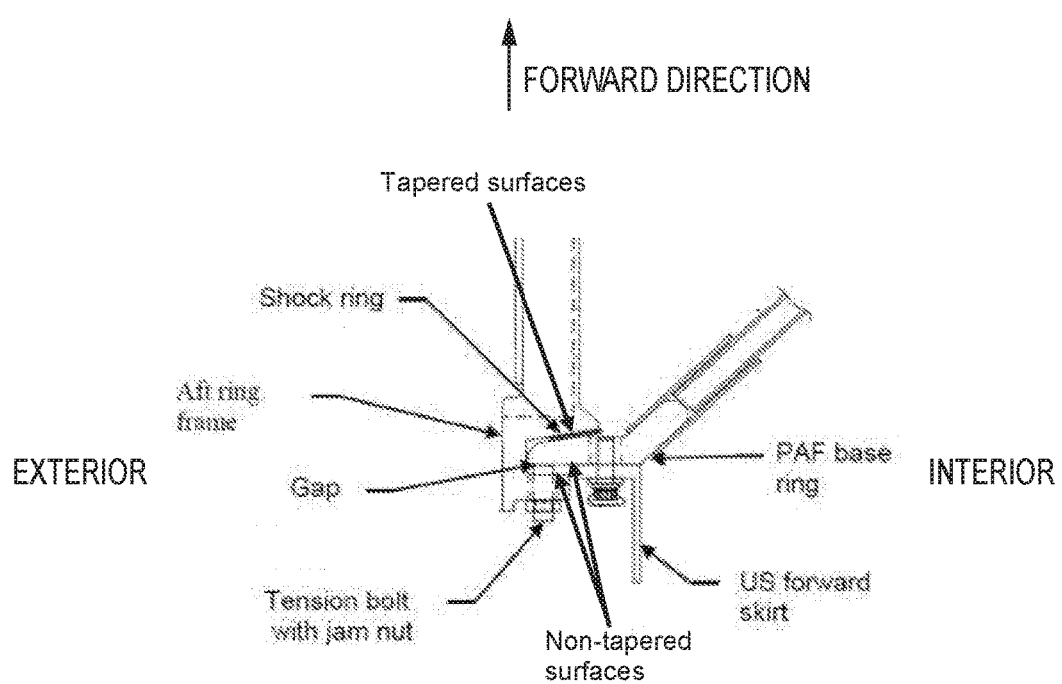
FIG. 1 shows a prior art single-taper clamping joint.
Figure 2:
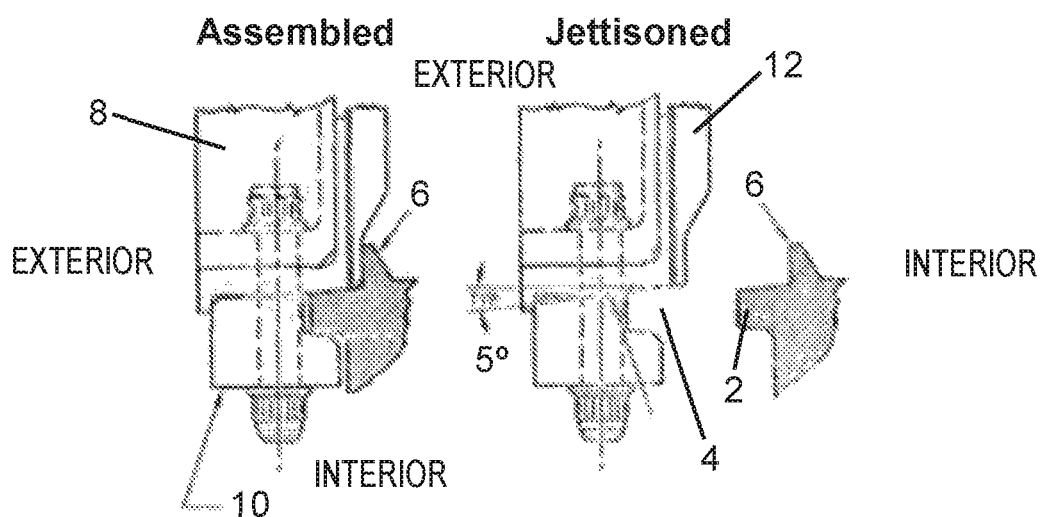
FIG. 2 shows a prior art cleat clamping joint.
Figure 3:
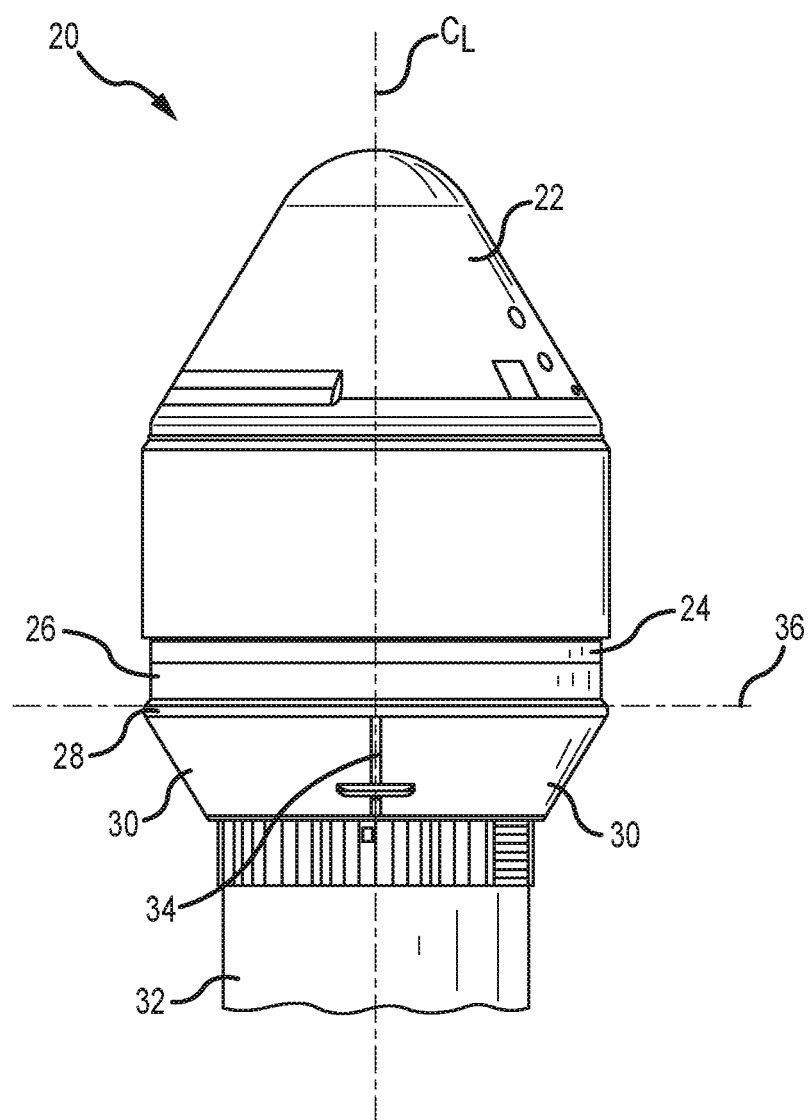
FIG. 3 is a front elevation view of one embodiment of a LVA with a clamping joint.

Referring now to FIG. 3, which is a front elevation view of one embodiment of an integrated launch vehicle with spacecraft or vehicle 20 with a clamping joint. As shown, the vehicle 20 comprises a spacecraft 22, a spacecraft aft ring 24, a launch vehicle adapter ("LVA") (also called the LVA forward ring) 26 proximate the aft portion of the spacecraft 22, a separation ring 28, and fairings 30. The vehicle 20 also comprises an upper or second stage 32 including a rocket or booster (not shown). Note that the LVA 26, fairings 30, and struts 40, are all part of the upper stage. The spacecraft 22 may include one or more satellites and/or other delicate instrumentation, a crew module (e.g., the crew space transportation "CST"), and/or a service module. The vertical center line $C_L$ of the integrated launch vehicle 20 is also shown in FIG. 3.

The fairings 30 separate or split along the fairing vertical separation plane 34. Two fairings 30 are shown, but those skilled in the art will recognize that various numbers of fairings 30 may be used. Also, fairings may be located at other positions along the length of the vehicle 20. For example, payload fairings typically surround the payload to protect it before and during launch until a predetermined point in the launch sequence. However, the additional weight of the fairings 30 is not needed once the spacecraft 22 reaches the predetermined altitude. At that predetermined point, the fairings 30 are commanded to separate and fall away from the vehicle 20. As shown, the fairings 30 separate from the other launch vehicle components along the fairing horizontal separation plane 36. It should be appreciated that the invention may also be used with the separation of other fairings, including payload fairings, from the integrated launch vehicle 20.

Note that the horizontal plane (Hp) discussed herein and shown in the drawings is parallel to the fairing horizontal separation plane 36. The fairing horizontal separation plane 36 is perpendicular to the longitudinal centerline of the vehicle 20 (i.e., the vertical centerline when the vehicle 20 is oriented in the launch position and sitting on the launch pad). The radial direction of the vehicle 20 is perpendicular to and extends outwardly from the longitudinal centerline of the integrated launch vehicle 20. Unless otherwise specified, the directions and positions are relative to a spacecraft or launch vehicle in the upright position in the launch configuration. Thus, upper usually refers to the forward portion and lower usually refers to the aft portion.

Generally, a separation ring 28 is used to separate one part of the vehicle 20 from another part of the vehicle 20. As shown in FIG. 3, the LVA fairings 30 are interconnected to the separation ring 28 on a lower end of the separation ring 28 and the LVA 26 is interconnected to the separation ring 28 at the upper end of the separation ring 28. Here, the separation ring 28 separates the fairings 30 from the upper stage 32 and LVA 26. In some embodiments, the separation ring 28 separates the upper stage 32 from the lower stage or booster.

Figure 4:
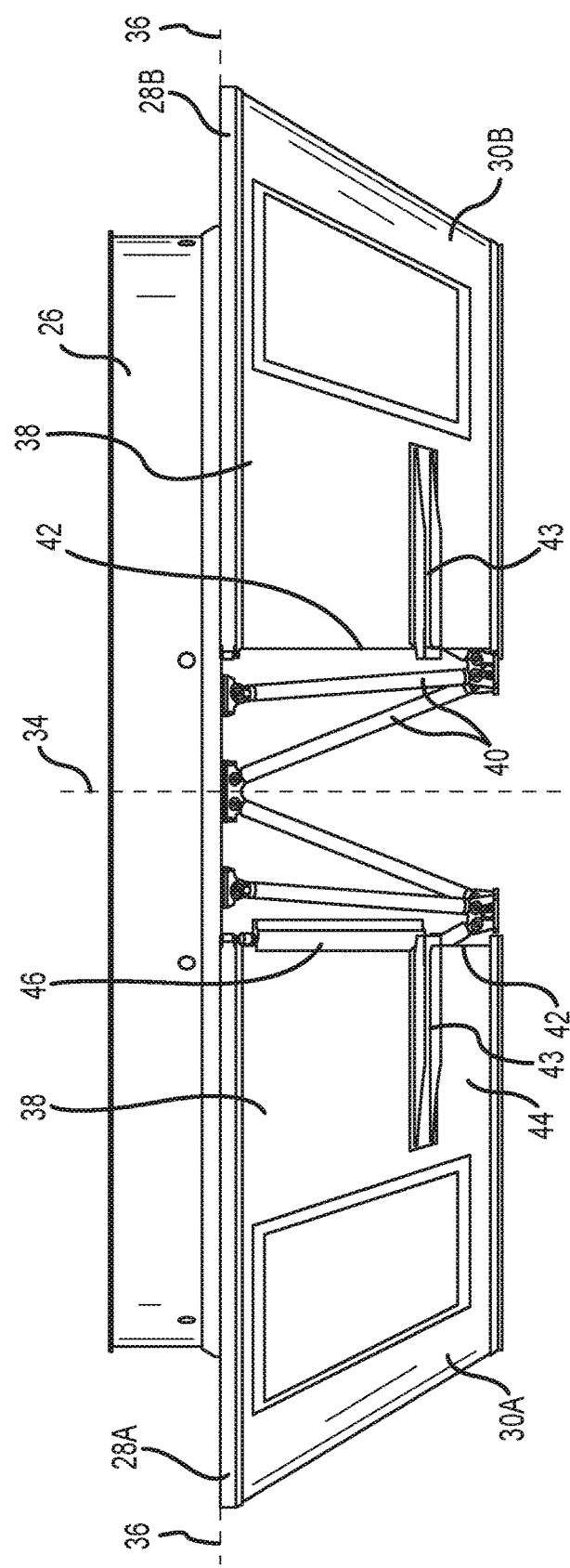
FIG. 4 is a front elevation view of a portion of the LVA showing the separation ring and fairings separated from the LVA.
Figure 5:
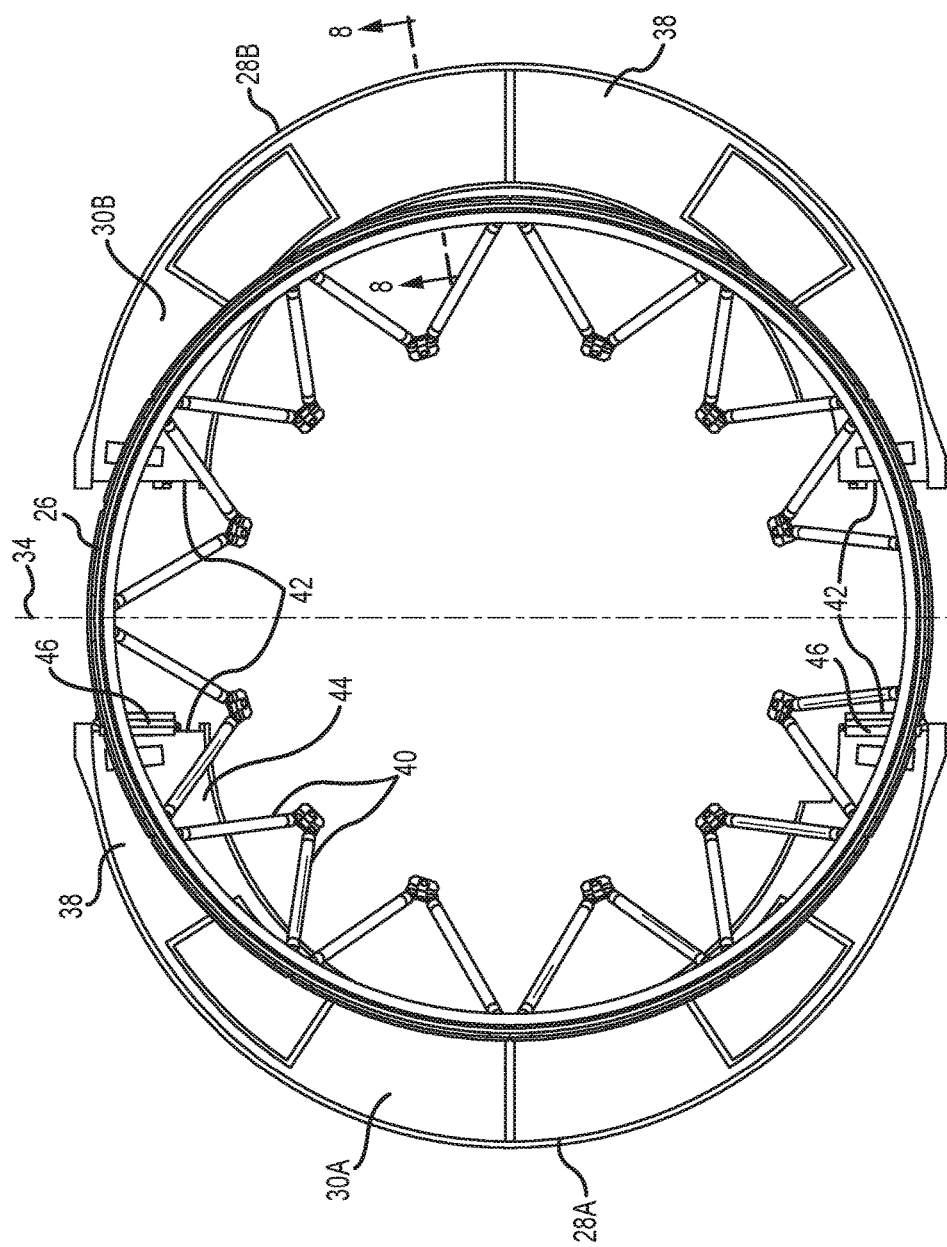
FIG. 5 is a top plan view of the portion of the LVA shown in FIG. 4.

FIGS. 4 and 5 show two fairings 30A, 30B separated along the fairing vertical separation plane 34. The separation ring is comprised of two separation ring halves 28A, 28B, which are each interconnected to an upper end 38 of a fairing 30A, 30B. The separation ring halves 28A, 28B are not interconnected to one another in FIGS. 4 and 5. Further, the LVA 26 is detached from the separation ring halves 28A, 28B along the fairing horizontal separation plane 36. Support struts 40 interconnect the upper stage 32 to a lower portion of the LVA 26.

In one embodiment, compressed gas or explosive devices are used so that, when desired, decompression of the gas or explosion separates the fairings 30A, 30B from one another and away from the integrated launch vehicle 20 and LVA 26. The explosive devices may be detonated automatically when the vehicle 20 reaches a predetermined altitude or based upon some other determination, or may be activated manually. The fairings 30A, 30B are interconnected to one another along the vertical separation line 34 where the vertical ends 42 of the fairings 30A, 30B generally abut one another and are joined together via separation bolts. The fairings 30A, 30B include separation fittings 43 that interface when the fairings are joined. The separation bolts are charged such that controlled charges can be used to separate the fairings 30A, 30B from one another and eventually from the vehicle 20. In one embodiment, four separation bolts are used: (1) interconnecting a lower portion 44 of a first vertical end 42 of the first fairing 30A to a lower portion 44 of a first vertical end 42 of the second fairing 30B; (2) interconnecting an upper portion 38 of a first vertical end 42 of the first fairing 30A to an upper portion 38 of a first vertical end 42 of the second fairing 30B; (3) interconnecting a lower portion 44 of a second vertical end 42 of the first fairing 30A to a lower portion 44 of a second vertical end 42 of the second fairing 30B; and (4) interconnecting an upper portion 38 of the second vertical end 42 of the first fairing 30A to an upper portion 38 of the second vertical end 42 of the second fairing 30B. More or fewer separation bolts can be used in alternate embodiments. Additionally, a thrusting joint 46 is positioned along each vertical end 42 of the first fairing 30A or the second fairing 30B. The thrusting joint 46 can include a plenum chamber or structure positioned along the vertical ends 42 of either the first or second fairing 30A, 30B such that during separation the plenum structure inflates to push the vertical ends 42 of the fairings 30A, 30B apart. The thrusting joint 46 must be strong enough to overcome the frictional engagement between the separation ring halves 28A, 28B and the LVA 26 and to fully clear all structure aft on the integrated launch vehicle 20 (addressed in greater detail below). Shock waves and vibration generated by the controlled charges and thrusting joint 46 disseminate through the body of the vehicle 20. These kinds of shockwaves and vibrations are exemplary of the events that embodiments of the present invention are designed to address.

Figure 6:
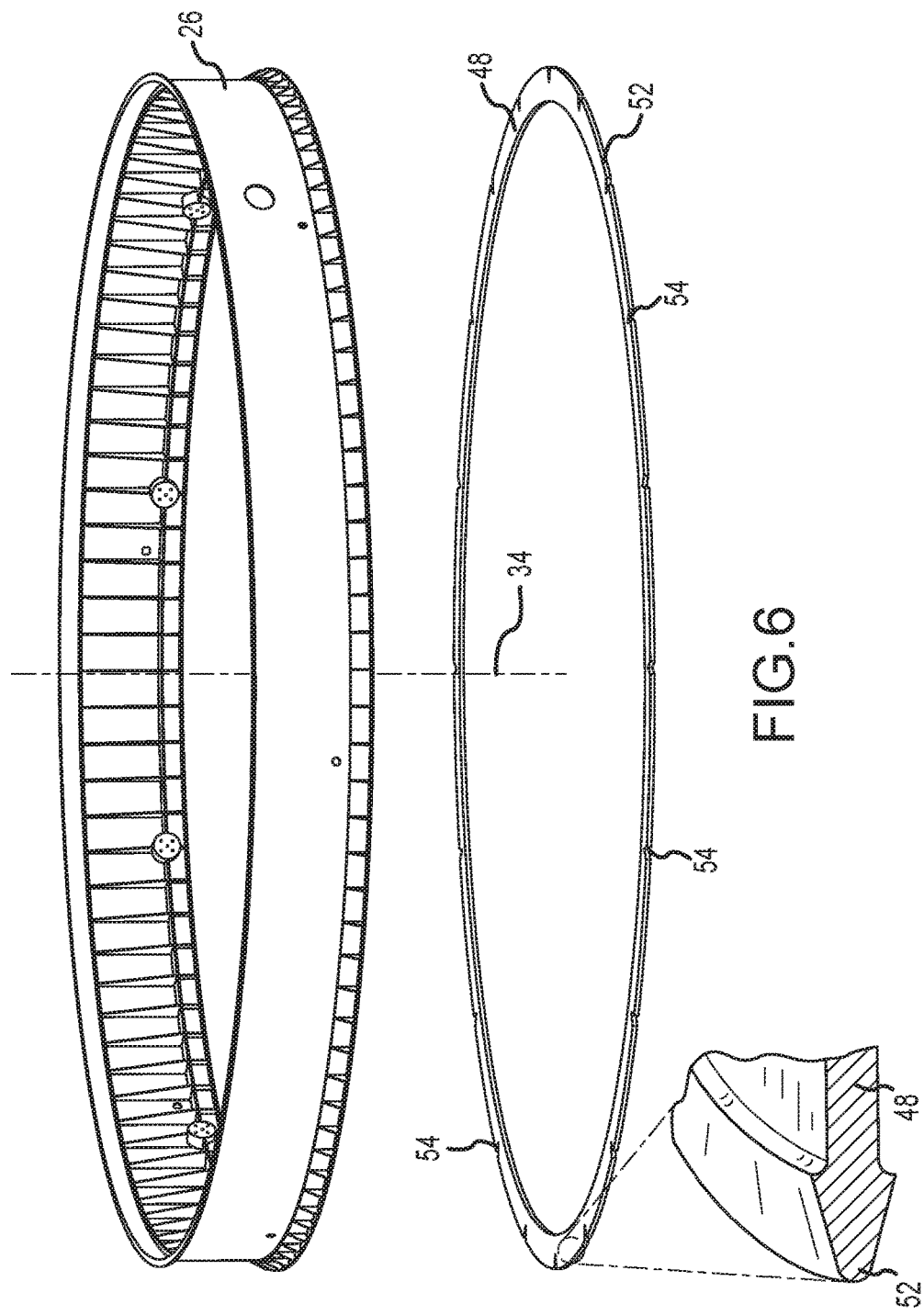
FIG. 6 is an exploded perspective view of one embodiment of an LVA and an annular plate.

FIG. 6 is an exploded perspective view of one embodiment of the launch vehicle adapter 26 and annular plate 48. The annular plate 48 is mounted to the lower portion of the LVA 26. As is shown in the enlarged portion of the annular plate 48, the outer perimeter edge of the annular plate 48 is configured in the shape of a tongue 52 and forms part of the clamping system. The outer perimeter of the annular plate 48 also includes bolt cutouts 54, which are described in detail below. The annular plate 48 may be a single annular structure or may be manufactured in segments or discrete lengths.

Figure 7A:
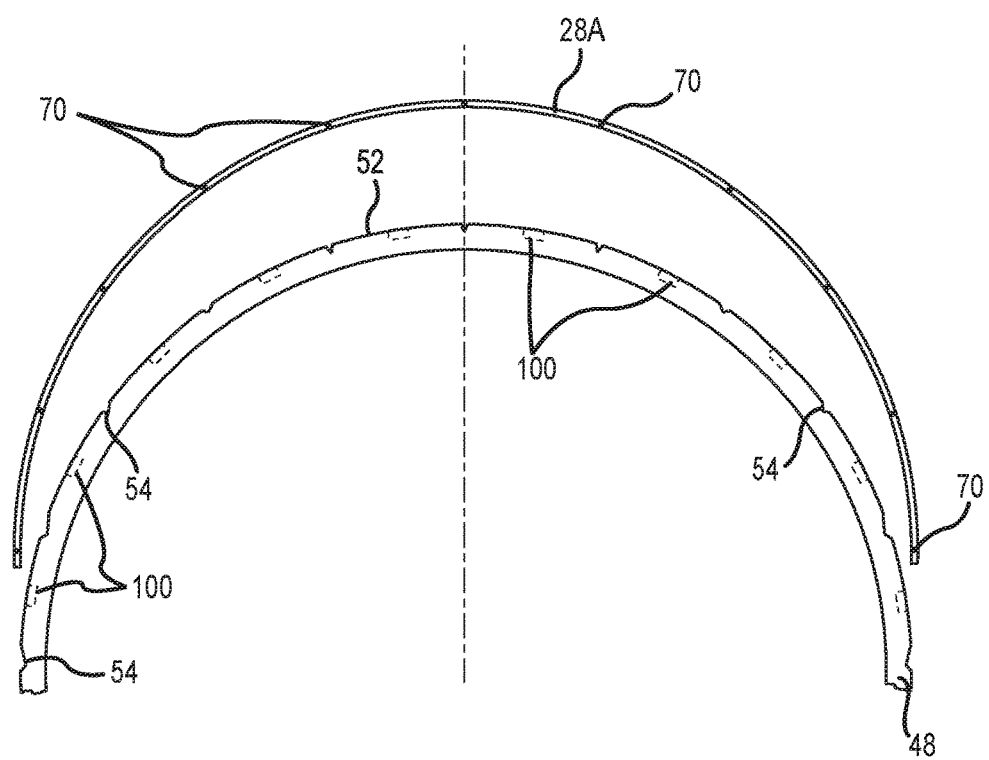
FIG. 7A is a top plan view of half of the annular plate separated from the separation ring half.
Figure 7C:
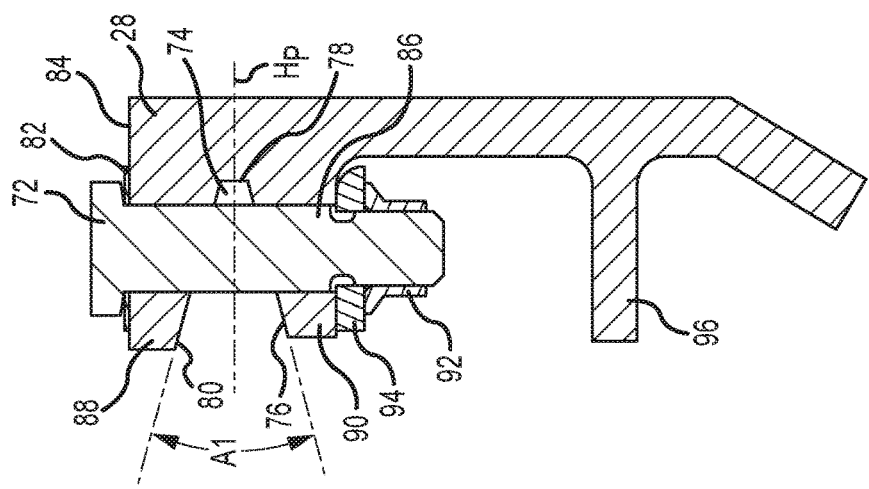
FIGS. 7B-C show a bolt in the separation ring.
Figure 7B:
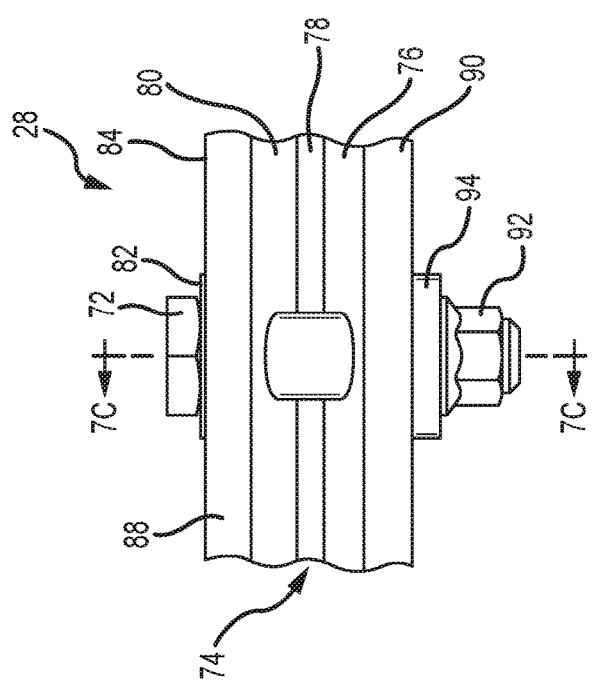

FIG. 7A is a top plan view of half of the annular plate 48 separated from the LVA 26 and the separation ring half 28A. The other separation ring half (28B, not shown) is a mirror image of the first separation ring half 28A. The separation ring half 28A comprises a plurality of bolt holes 70 to receive bolts (not shown) in a spaced orientation around the separation ring half 28A proximate the outer edge of the separation ring half 28A. The annular plate 48 comprises a plurality of bolt cutouts 54 that align with the plurality of bolt holes 70 and bolts in the separation ring half 28A. Thus, as installed the bolts do not pass through the tongue 52 formed at the perimeter edge of the annular plate 48. Rather, the bolts are positioned in the bolt cutouts 54. The number of bolt cutouts 54 and bolt holes 70 can vary, as the quantity of bolt cutouts 54 shown in FIGS. 6 and 7A is one example only and for illustrative purposes only. FIGS. 7B-C show one bolt 72 in a bolt hole 70 of the separation ring 28. FIG. 7B is an elevation view of the inner surface of the separation ring 28 and shows the tongue groove 74. FIG. 7C is a cross-sectional view of the bolt 72 and separation ring 28. As illustrated, the bolt 72 extends through the tongue groove 74. The tongue groove 74 comprises a lower angled surface 76, a substantially vertical rear surface 78, and an upper angled surface 80, where the angles are measured relative to a horizontal plane Hp, which is parallel to the fairing horizontal separation plane 36. The angled upper surface 80 and the angled lower surface 76 form an opening with an angle A1. The head of the bolt 72 is positioned on a washer 82 positioned on the upper outer (i.e., forward) surface 84 of the separation ring 28. The cylindrical or body portion 86 of the bolt 72 extends through the upper flange 88 of the tongue groove 74 and the lower flange 90 of the tongue groove 74. The bolt 72 is secured using a nut 92 and a washer 94 positioned below or aft of the lower flange 90 of the tongue groove 74. The bolts 72 prevent the entire fairing and separation ring 28 from rotating relative to the annular plate 48 and LVA forward ring 26. Thus, the bolts 72 prevent the separation ring 28 from rotating or deflecting in the hoop direction, where the hoop direction means rotation around the ring. The bolts 72 and bolt cutouts 54 also help to properly clock and index the fairing 30 and separation ring half 28A onto the annular plate 48 and LVA 26. The bolt 72 is only reacting to the shear loads of the fairing and separation ring 28 on the tongue 52. Furthermore, the bolts 72 are not intended to apply preload to anything within the tongue and groove joint. The nuts 92 are installed on the bolts 72 with a relatively light torque and are only intended to aid in bolt retention and to eliminate any loose parts from vibrating during ascent. The bolts 72 are only loaded during flight and, then, they are only loaded in shear. In one embodiment, all of the bolt cutouts 54 in the annular plate 48 have the same shape (see, e.g., FIG. 6). In other embodiments, the shape of the bolt cutouts 54 vary around the annular plate 48 (see, e.g., FIG. 7A) to allow the radial jettison of the fairing 30 during separation. Thus, the shape of the bolt cutouts 54 shown in FIG. 7A reduce scraping and vibration during separation because the bolts 72 can slide in the radial jettison direction (substantially parallel to the dashed centerline in FIG. 7A) without contacting the annular plate 48.

FIG. 7C is a cross-sectional view of FIG. 7B taken along cut 7C-7C, but FIG. 7C shows the entire separation ring 28 and not just the separation ring's upper portion with the groove 74. The separation ring 28 includes a structural rib 96 that extends inwardly from the inner surface of the separation ring 28 and around all or a portion of the separation ring 28. In alternative embodiments, the structural rib 96 is not continuous and only extends around portions of the inner surface of the separation ring 28. In one embodiment, the upper flange 88 of the tongue groove 74 is slightly wider in the horizontal direction than both the lower flange 90 of the tongue groove 74 and the structural rib 96 of the groove, where the width is measured from the exterior surface of the separation ring 28 to the vertical internal surface of the flange 88, 90 or rib 96. The lower flange 90 can be smaller than the upper flange 88 because gravity and loading do not influence the lower flange's 90 engagement and a smaller lower flange 90 provides clearance to adjacent hardware on the LVA 26. Additionally, the size of the rib 96 is determined by the desired separation ring stiffness and strength. The upper flange 88 is sized to provide tongue 52 and groove 74 engagement (or overlap between parts) to ensure the fairing 30 will never inadvertently create a radial gap between the groove 74 and the mating tongue 52. Thus, the upper flange 88 extends toward the center of the separation ring 28 farther than the lower flange 90 of the tongue groove 74 and farther than the structural rib 96.

FIG. 8A is a partially exploded, cross-sectional view of the section along cut 8-8 of FIG. 5 and shows one embodiment of a clamping joint system. The clamping joint system includes a separation ring 28 with a groove 74 (also called a tongue groove), an annular plate 48 (also called a closeout plate) with a tongue 52 extending around at least a portion of the outer circumference of the annular plate 48, and a plurality of wedge blocks 100. The LVA 26 is interconnected to an upper surface of the annular plate 48 via bolts or other known interconnection means. Alternatively, the LVA 26 and the annular plate 48 could be one piece that is forged as one piece. The upper end 38 of the fairing 30 is interconnected to the lower portion of the separation ring 28 via a plurality of bolts 102. In FIG. 8A, the fairing 30 and separation ring 28 are shown separated slightly laterally or radially from the LVA 26 and annular plate 48.

The tongue groove 74 is formed by an upper flange 88 and a lower flange 90 and is sized to receive the tongue 52. A series of spaced-apart cutouts 104 (also called wedge block cutouts, pockets, or wedge block grooves) are formed in the lower flange 90 of the tongue groove 74 for receiving wedge blocks 100. Each cutout 104 receives one wedge block 100. A portion of one such cutout 104 is shown in cross-section in FIGS. 8A, 8C and 9. Thus, the groove 74 actually has two cross sections: a first cross-sectional shape shown in FIG. 8B with an opening 74 forming an angle A1 to accommodate the tongue 52 alone, and a second cross-sectional shape shown in FIG. 8C with an opening 104 forming an angle A2 to accommodate the wedge block 100 and the tongue 52. FIG. 7A shows the positions of multiple wedge blocks 100 relative to the annular plate 48, assuming the tongue 52 has been inserted into the groove 74 of the separation ring half 28A. One wedge block 100 is centrally located between each pair of bolt cutouts 54 (shown in FIGS. 6 and 7A) in order to apply a uniform clamping pressure and remove clearances within the tongue and groove interface that would allow relative movement between the separation ring 28 and the tongue 52. Because the annular plate 48 is detached from the separation ring half 28A in FIG. 7A, the as-assembled positions of the wedge blocks 100 are shown in phantom lines on the annular plate 48. In the embodiment shown, ten wedge blocks 100 are used per separation ring half 28A. In one embodiment, the separation ring 28 comprises between about 10 and about 50 wedge block cutouts 104. In a preferred embodiment, the separation ring 28 comprises between about 15 and about 40 wedge block cutouts 104. In a more preferred embodiment, the separation ring 28 comprises about 24 wedge block cutouts 104; thus, 12 wedge blocks 100 are used per separation ring half 28A and 28B. The number of cutouts 104 will be generally proportional to the length of the groove 74. In the context of a generally cylindrical spacecraft, this would be the circumferential length of groove 74. Typically, but not always, the wedge blocks 100 are equally spaced apart. The launch vehicle, LVA 26, and spacecraft designs, configurations, constructions, and component loads are factors relevant to the locations and sites of the wedge blocks 100.

In some embodiments, the tongue 52 of the annular plate 48 extends around the entire perimeter of the annular plate 48. In other embodiments, one example of which is FIG. 7A, the tongue 52 only extends around discrete portions or segments of the perimeter of the annular plate 48. In the embodiment of FIG. 8A, the tongue 52 is symmetrical relative to a horizontal plane and is shaped like an arrowhead, meaning that the distal end of the tongue 52 is thinner than the proximal portion of the tongue 52 proximate to the annular plate 48, thus forming an arrowhead shape. Alternatively, the tongue 52 could be shaped differently, e.g., asymmetric, have a more square-shaped end, or a more circular-shaped end, etc., as long as neither side of the tongue 52 is parallel to the fairing horizontal separation plane 36. Additionally, the proximal portion of the tongue 52 (i.e., the portion proximate the annular plate 48) is cross-sectionally wider than the thickness of the annular plate 48. However, in alternative embodiments, the annular plate 48 is the same thickness or height as the thickest portion of the tongue 52. In alternative embodiments, the plate 48 can be thicker than the tongue 52.

In FIG. 8A, a wedge block 100 is shown positioned in a partial wedge block cutout 104 and specifically is positioned in the bottom of the wedge block cutout 104 such that the flange-interfacing surface 106 (also called the lower surface when shown in the orientation of FIGS. 8A-13) of the wedge block 100 is resting on the upper surface 108 of the wedge block cutout 104. Additionally, the bolt 110 holding the wedge block 100 in position can be seen. As illustrated, the separation ring 28 has not been mounted to the LVA 26 such that the tongue 52 is not yet positioned in the groove 74.

Figure 9:
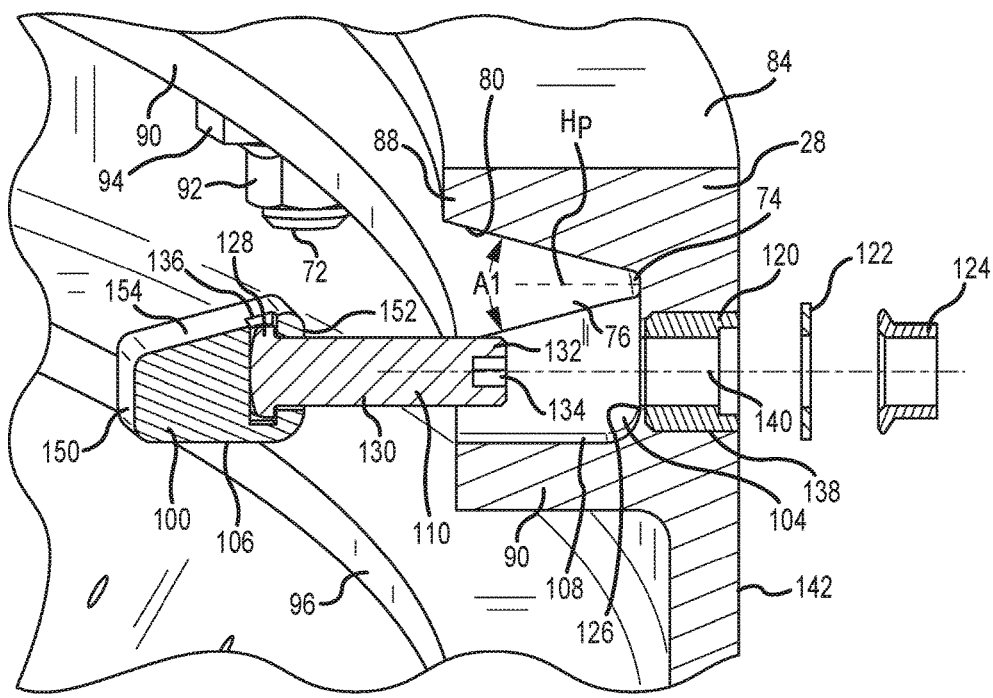
FIG. 9 is a cross-sectional view of the separation ring of FIG. 8A and further showing a wedge block and associated locking hardware in an exploded position.
Figure 10:
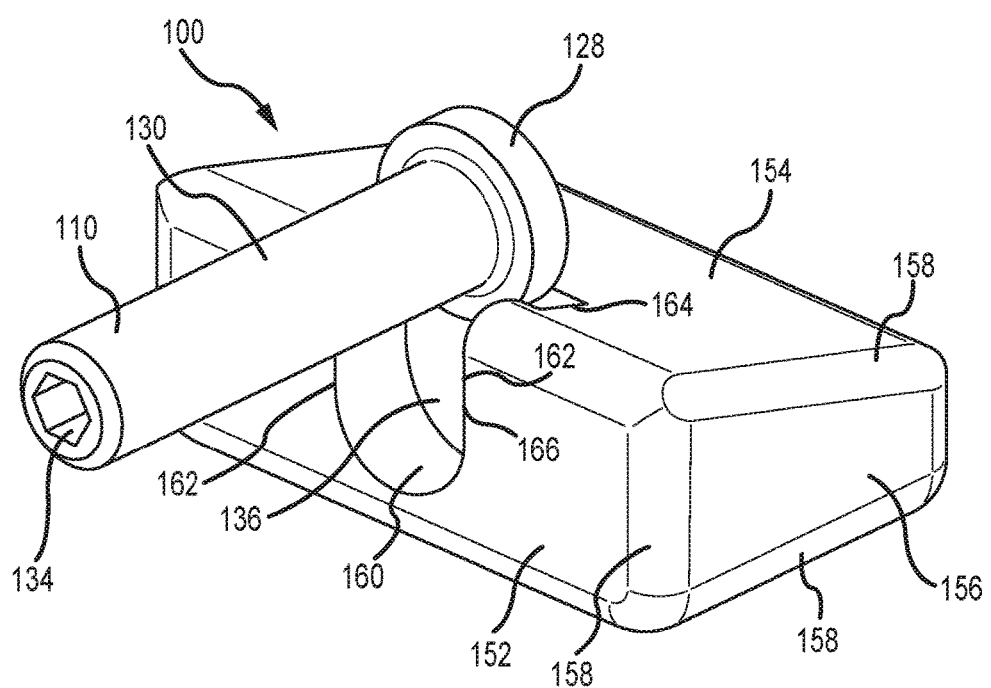
FIG. 10 is a perspective exploded view of one embodiment of a wedge block and bolt.

FIG. 9 is an exploded cross-sectional view of the separation ring 28, the wedge block 100, and the locking hardware associated with the wedge block 100. The portions of the clamping joint system shown include the tongue groove 74 in the separation ring 28, a wedge block 100, a wedge block cutout 104, a bolt 110, a cylindrical insert (also called a bushing or an embed) 120, a washer 122, and a nut 124. A bolt 72 is shown extending through the lower flange 90 of the tongue groove 74. The bolt 72 is secured using a washer 94 and a nut 92. In some embodiments, the insert 120 has a threaded inner diameter/surface.

According to one embodiment of the present invention, the angle of the lower surface 76 of the tongue groove 74 relative to a horizontal plane Hp is between about 5 degrees and about 25 degrees. In a preferred embodiment, the angle of the lower surface 76 of the tongue groove 74 relative to a horizontal plane Hp is between about 10 degrees and about 20 degrees. In a more preferred embodiment, the angle of the lower surface 76 of the tongue groove 74 relative to a horizontal plane Hp is about 15 degrees. According to one embodiment of the present invention, the angle of the upper surface 80 of the tongue groove 74 relative to a horizontal plane Hp is between about 5 degrees and about 25 degrees. In a preferred embodiment, the angle of the upper surface 80 of the tongue groove 74 relative to a horizontal plane Hp is between about 10 degrees and about 20 degrees. In a more preferred embodiment, the angle of the upper surface 80 of the tongue groove 74 relative to a horizontal plane Hp is about 15 degrees. In one embodiment, the angle A1 between the upper surface 80 and the lower surface 76 of the tongue groove 74 is between about 15 degrees and about 45 degrees. In a preferred embodiment, the angle A1 is between about 25 degrees and about 35 degrees. In a more preferred embodiment, the angle A1 is about 30 degrees. The upper surface 108 of the wedge block cutout 104 is substantially flat and substantially parallel to the horizontal plane Hp. The inner surface 126 of the wedge block cutout 104 is substantially vertical (i.e., perpendicular to the horizontal plane Hp). The upper (i.e., forward) surface 84 of the upper flange 88 of the tongue groove 74 is also substantially flat and substantially parallel to the horizontal plane Hp.

The bolt 110 includes a head 128 on one end interconnected to a cylindrical portion 130 terminating in a second end 132 opposite the head 128. The head 128 may be circular, four-sided, five-sided shape, six-sided shape (i.e., be hexagonal or be a hex bolt), or any other shape known or used in the art. The upper surface of the head 128 may be flat, rounded (i.e., dome shaped), oval shaped, or pan shaped (i.e., have a slightly rounded head with short vertical sides). The underside of the head 128 proximate the cylindrical portion 130 may be flat or angled (i.e., countersunk). Alternatively, bolt 110 may not use a head 128, but could use a simple shaft snap ring or spring clip for retention. The second end 132 of the bolt 110 includes a socket or recess 134. The socket or recess 134 may have a square shape, other four-sided shape, five-sided shape, six-sided shape (i.e., be an Allen drive or hex socket), or any other shape known or used in the art. In alternative embodiments, the second end 132 of the bolt 110 can have a cut or indentation (i.e., drive type) similar to a Phillips, Frearson, slotted, combination of Phillips and slotted, one-way, square, or star drive type. The exterior of the cylindrical portion 130 is threaded along at least a portion of its length and preferably along most of its length. From an assembly standpoint, the head 128 of the bolt 110 is inserted into a slot (also called a cutout) 136 in the wedge block 100. The cylindrical portion 130 of the bolt 110 is inserted through a bore or hole 138 positioned proximate the wedge block cutout 104 in the separation ring 28. In one embodiment, an embed or insert 120 is positioned in the bore or hole 138 in the separation ring 28. The insert 120 includes a bore or hole 140 that aligns with the bore 138 in the separation ring 28. A nut 124 is threaded on the end of the threaded cylindrical portion 130 of the bolt 110 that extends out of the insert 120. A washer 122 is typically positioned between the separation ring 28 outer surface 142 and the nut 124. Alternatively, the nut 124 could be a flange nut and have the washer built into the nut. The recess or slot 134 in the second end 132 of the bolt 110 is used to tighten and/or move the bolt 110 from an exterior surface of the separation ring 28. A wrench is used to rotate the nut 124 while the bolt 110 is held stationary by inserting an appropriately configured tool, such as an Allen wrench, into the recess 134 in the second end 132 of the bolt 110. The nut 124 can be any nut known in the art, including a hex nut, jam nut, wing nut, cap nut, acorn nut, tee nut, square nut, prevailing torque lock nut (i.e., a non-reversible lock nut), k-lock or kep nut, two-way reversible lock nut, coupling nut, slotted nut, or castle nut. The nut 124 can be made of metal, ceramic, plastic, or any other material known in the art. Additionally, the nut 124 can include an insert such as a nylon insert to prevent backing off (i.e., be a Nylock nut). Thus, the wedge block 100 is pulled into the wedge block cutout 104 and is positioned by rotating the bolt 110 relative to the nut 124. One novel aspect of embodiments of the present invention is that the bolts 110 used with the wedge blocks 100 are positioned parallel to the fairing horizontal separation plane 36 (i.e., horizontally in a launch configuration), rather than perpendicular to the fairing horizontal separation plane 36 (i.e., vertically in a launch configuration), and are accessible from the exterior of the spacecraft or vehicle 10 even when used in embodiments with the tongue and groove interface at the forward end of the fairings.

With reference to FIGS. 8A-11B, the wedge block 100, when viewed in cross section, has a substantially vertical side along the inwardly-oriented end surface 150; a substantially vertical side along the outwardly-oriented end surface 152 positioned closest to the exterior of the separation ring 28 or away from the center point of the separation ring 28; a substantially horizontal side along the lower surface 106; a downwardly-angled side along the tongue-interfacing surface 154 (also called the upper surface when positioned as shown in FIGS. 8A-13); two trapezoidal, substantially vertical sides 156; and a cutout 136. The edges 158 of the wedge block 100 may be rounded or sharp depending on the particular embodiment. The upper surface 154 of the wedge block 100 is positioned at an angle relative to a horizontal plane Hp and the angle of the upper surface 154 is substantially the same angle as the downwardly angled lower surface 76 of the tongue groove 74. Thus, the lower surface 159 of the tongue 52 interfaces relatively evenly with the downwardly angled lower surface 76 of the tongue groove 74 and the upper surface 154 of the wedge block 100. According to one embodiment of the present invention, the angle of the upper surface 154 of the wedge block 100 relative to a horizontal plane Hp is between about 5 degrees and about 25 degrees. In a preferred embodiment, the angle of the upper surface 154 of the wedge block 100 relative to a horizontal plane Hp is between about 10 degrees and about 20 degrees. In a more preferred embodiment, the angle of the upper surface 154 of the wedge block 100 relative to a horizontal plane Hp is about 15 degrees. The lower surface 106 of the wedge block 100 is substantially horizontal such that it rests on the substantially horizontal upper surface 108 of the wedge block groove 104.

The cutout 136 of the wedge block 100 can be any shape and can extend from either the upper surface 154 or the lower surface 106 to an interior portion of the wedge block 100. The cutout 136 is shaped to accommodate the head 128 of the bolt 110 and extends to the outwardly-oriented surface 152 of the wedge block 100. The portion of the cutout 136 extending to the outwardly-oriented surface 152 must be sized to accommodate the cylindrical portion 130 of the bolt 110. In the embodiment shown, the portion of the cutout 136 in the outwardly-oriented surface 152 has a rounded lower portion 160 to accommodate the cylindrical portion 130 of the bolt 110 and has two substantially vertical sides 162 extending from the rounded lower portion 160 to the upper surface 154 such that the bolt 110 can be slid down into the cutout 136. When viewed from above (see FIGS. 10 and 12 for alternative views), the cutout 136 has a T-shape with a wide portion 164 to accommodate the head 128 of the bolt 110 and a thin portion 166 to accommodate the cylindrical portion 130 of the bolt 110.

Figure 11A:
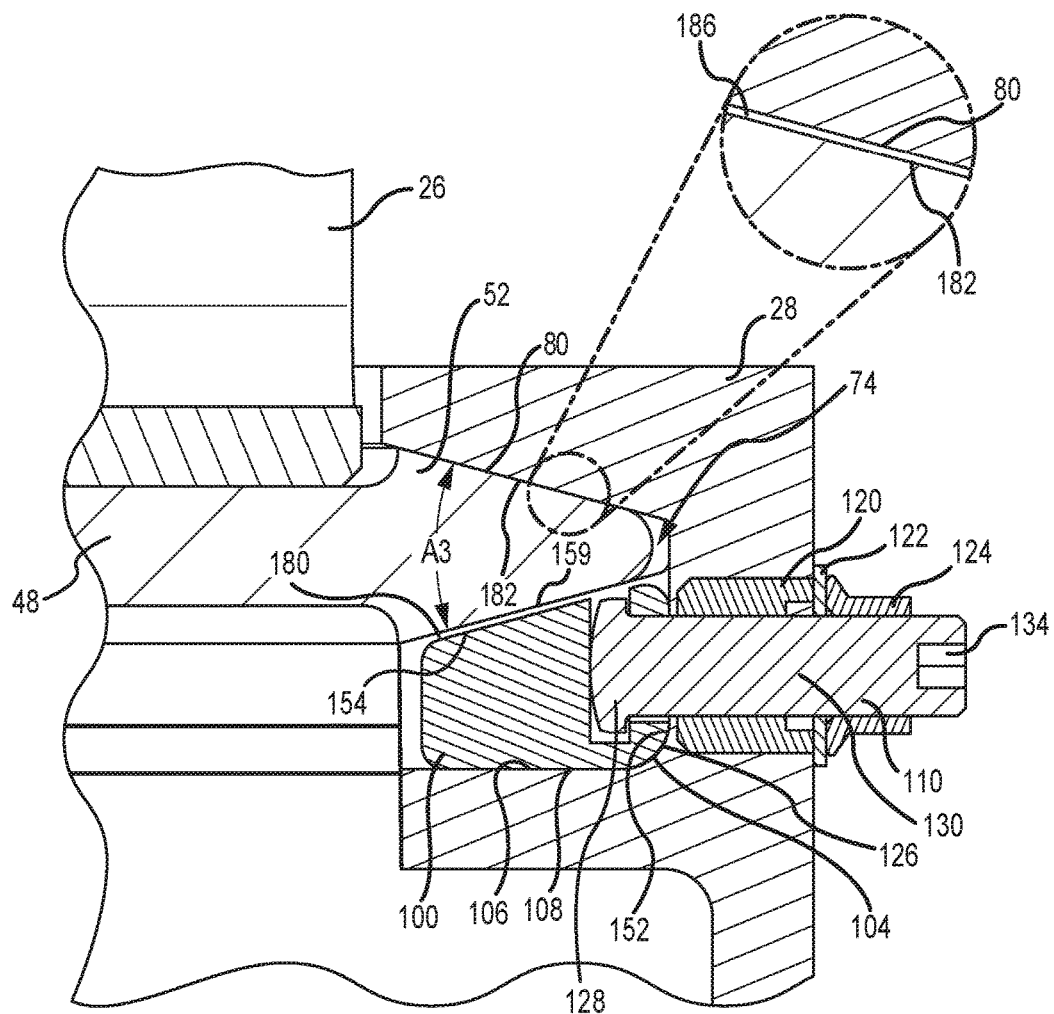
FIGS. 11A-B are assembled cross-sectional views of the clamping joint of FIG. 9.

FIG. 11A is a cross-sectional view of the clamping joint of FIG. 9 when the clamping joint is in an initial assembled position. The annular plate 48 is connected to the LVA 26. The tongue 52 extends from the perimeter of the annular plate 48 and is positioned in the groove 74. In this initial assembled position, the wedge block 100 is snugly positioned in the cutout 104 and the outwardly-oriented surface 152 of the wedge block 100 is positioned as close to the inner surface 126 of the wedge block cutout 104. In one embodiment, the tongue 52, groove 74, and wedge blocks 100 are designed such that the wedge blocks 100 will never contact the tongue 52 when the wedge blocks 100 are fully retracted into the wedge block pockets 104. The substantially horizontal side along the lower surface 106 of the wedge block 100 is positioned adjacent to and resting on the upper surface 108 of the cutout 104. The downwardly-angled side along the upper surface 154 of the wedge block 100 is positioned proximate to and perhaps slightly spaced from the lower surface 159 of the tongue 52 to form a gap 180. Depending on tolerance and assembly, these two surfaces 154, 159 may be abutting. Additionally, depending on tolerance and assembly, there may be a gap 186 between the upper surface 182 of the tongue 52 and the upper surface 80 of the tongue groove 74, as is shown in the enlarged portion. The wedge blocks 100 help to remove this gap 186. In any complete configuration, both conditions may be present. Also depending on tolerance and assembly, there may be a gap between the upper surface 108 of the wedge block cutout 104 and the lower surface 106 of the wedge block 100. In any complete configuration, two or three of these conditions may be present.

In the illustrated embodiment, the tongue 52 has an arrow head shape with a rounded point or distal end. The arrow head of the tongue 52 forms an angle A3 between the upper surface 182 and lower surface 159 of the tongue 52. Angle A3 corresponds to and compliments angle A1 of the tongue groove 74. Angle A3 is between about 15 degrees and 50 degrees in one embodiment. In a preferred embodiment, angle A3 is between about 25 degrees and 35 degrees. In a more preferred embodiment, angle A3 is about 30 degrees. The upper surface 182 of the tongue 52 is positioned adjacent to the upper surface 80 of the tongue groove 74.

The bolt 110 is securely positioned with its head 128 in the cutout 136 of the wedge block 100 and its cylindrical portion 130 extending through the bore 140 of the insert 120, through the bore of the washer 122, and through the bore of the nut 124. The nut 124 is interconnected to the cylindrical portion 130 of the bolt 110. In the position shown in FIG. 11A, the wedge block 100 cannot move radially outwardly or inwardly because the bolt 110 and the nut 124 prevent the wedge block 100 from moving in a radial direction. However, the wedge block 100 can be moved in a radial direction by turning the bolt 110 relative to a stationary nut 124. In this manner, the wedge block 100 is advanced radially inwardly to remove the gap 180 and force the upper surface 182 of the tongue 52 into engagement with the upper surface 80 of the groove 74. Adjusting all of the wedge blocks 100 in this manner tightens the clamping joint as desired. It should be appreciated that the adjustment is made without any need to access the tongue and groove interface or access any structures or components interior of the fairing.

Figure 11B:
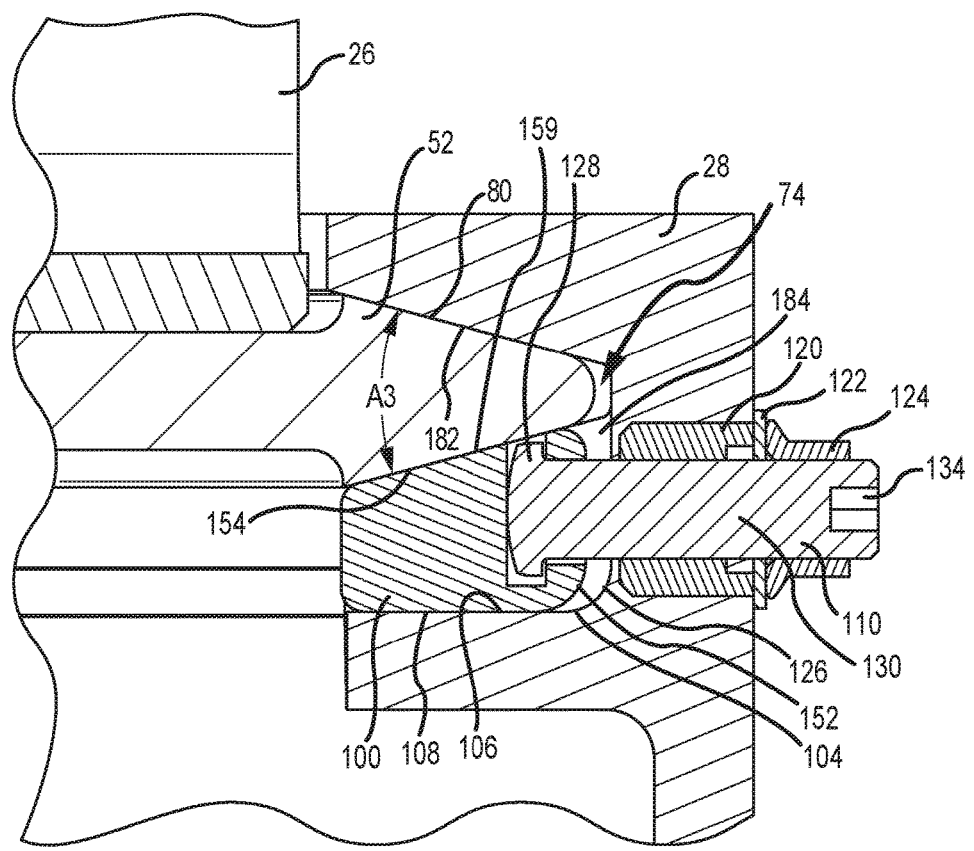

FIG. 11B is the same as FIG. 11A except that FIG. 11B shows the tongue and groove joint after the joint has been tightened by sliding the wedge block 100 radially inwardly into its final position. In FIG. 11B, the wedge block 100 has been moved to the left (i.e., inwardly toward the center of the ring 28 or center of the integrated launch vehicle 20). Thus, now there is a gap 184 between the outwardly-oriented surface 152 of the wedge block 100 and the inner surface 126 of the wedge block cutout 104. Additionally, there is no longer a gap (180 in FIG. 11A) between the upper surface 154 of the wedge block 100 and the lower surface 159 of the tongue 52. By moving the wedge block 100 inwardly, the upper surface 154 of the wedge block 100 engages the lower surface 159 of the tongue 52. As the wedge block 100 is pushed inwardly, the upper surface 154 of the wedge block 100 pushes on the lower surface 159 of the tongue 52, which puts and inwardly-oriented and upwardly-oriented force on the tongue 52. The force by the wedge block 100 also pushes the tongue 52 closer to the upper surface 80 of the tongue groove 74. Thus, in flight the gap between the lower surface 159 of the tongue 52 and the lower surface 76 of the groove 74 is reduced because in flight, nominal loads (e.g., gravity and flight acceleration) will always close a gap on the upper surfaces 182, 80. Additionally, the rattle space available between the tongue 52 and groove 74 is reduced to prevent the fairing 30 from vibrating around. Further adjustment clamps the tongue 52 relative to the groove 74. Accordingly, the separation ring 28 is held in place via the wedge blocks 100.

In various embodiments, the upper surface 182 of the tongue 52 is oriented at substantially the same angle as the upper angled surface 80 of the tongue groove 74 and the lower surface 159 of the tongue 52 is oriented at substantially the same angle as the lower angled surface 76 of the tongue groove 74. Additionally, in the portions of the joint where the tongue 52 is positioned above and adjacent to a wedge block 100, the lower surface 159 of the tongue 52 is positioned adjacent to the upper angled surface 154 of the wedge block 100 and, thus, the lower surface 159 of the tongue 52 is oriented at substantially the same angle as the upper angled surface 154 of the wedge block 100. Thus, the parts 52, 74 are toleranced and machined in a manner to minimize the differences in the angles of the parts in order to maximize the contact area between the lower surface 76 of the tongue 52 and the upper surface 154 of the wedge block 100. Further, the lower surface 106 of the wedge block 100 is positioned adjacent to and rests on the upper surface 108 of the wedge block cutout 104. Thus, the lower surface 106 of the wedge block 100 is oriented at substantially the same angle as the upper surface 108 of the wedge block cutout 104.

Figure 12:
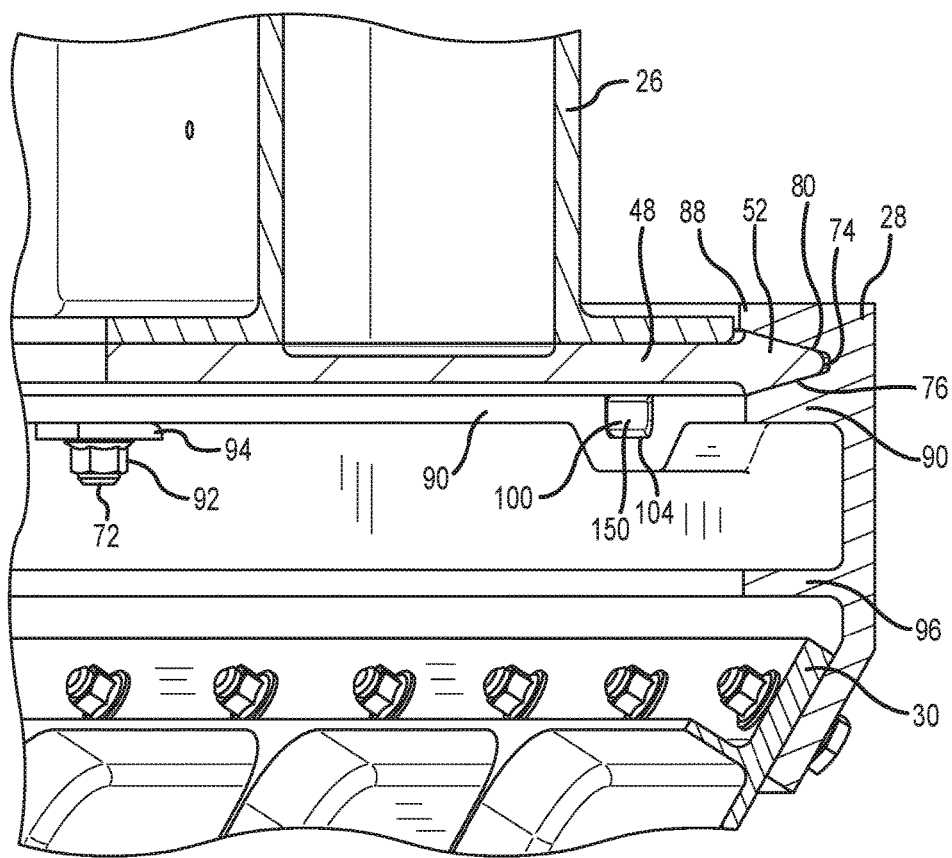
FIG. 12 is a perspective cross-sectional view of the clamping joint of FIG. 8A showing one embodiment of the tongue and groove in cross-section.

FIG. 12 is a perspective cross-sectional view of the clamping joint of FIG. 8A, but taken at a slightly different cut location than FIG. 8A, shown in the final position. Here, the entire wedge block 100 and wedge block cutout 104 are visible and the cross-section of the portion of the groove 74 without the wedge block 100 or cutout 104 is visible, similar to FIG. 8B. The tongue groove 74 has an upper interior surface 80 that is angled upwardly and a lower interior surface 76 that is angled downwardly. The portion of the lower flange 90 that forms the wedge block cutout 104 is positioned lower than the portion of the lower flange 90 without the wedge block cutout 104. Thus, the lower flange 90 dips downwardly to create the wedge block cutout 104 and accommodate the wedge block 100. The inwardly-oriented surface 150 of the wedge block 100 is visible in FIG. 12.

Note that the angle A2 (shown in FIG. 8C) is related to and varies with the angle A1, the angle of the upper surface 80 of the tongue groove 74, and the angle of the upper surface 108 of the wedge block cutout 104. For example, if the lower surface 108 of the wedge block cutout 104 remains substantially parallel to the horizontal plane Hp but the angle of the upper surface 80 of the tongue groove 74 is increased or decreased relative to the horizontal plane Hp, then the angle A2 will increase or decrease, respectively. Additionally, if the angle A1 is increased, such as by increasing both the angles of the upper surface 80 and the lower surface 76 of the tongue groove 74, then the angle A2 will increase. The opposite is also true: if the angle A1 is decreased, such as by decreasing both the angles of the upper surface 80 and the lower surface 76 of the tongue groove 74, then the angle A2 will decrease. However, if the angle A1 is increased by only increasing the angle of the lower surface 76 of the tongue groove 74 relative to the horizontal plane Hp, then the angle A2 will not change unless the upper surface 108 of the wedge block cutout 104 is also changed. Further, the angle A2 will change if the upper surface 108 of the wedge block cutout 104 is positioned at an angle relative to the horizontal plane Hp. In sum, if the angle A2 is increased, then the angle A1 will change in one of the following ways: (1) angle A1 will increase symmetrically because the angles of the upper surface 80 and the lower surface 76 of the tongue groove 74 will increase symmetrically relative to the horizontal plane Hp; (2) angle A1 will increase asymmetrically because the angle of the upper surface 80 of the tongue groove 74 will increase but the angle of the lower surface 76 of the tongue groove 74 will not increase relative to the horizontal plane Hp; or (3) angle A1 will remain the same (i.e., the same amount of degrees) but the angle A1 will be asymmetrical relative to the horizontal plane Hp because the angle of the upper surface 80 of the tongue groove 74 will increase and the angle of the lower surface 76 of the tongue groove 74 will decrease the same amount the upper surface 80 increases. In scenarios (1) and (3), the angle of the upper surface 154 of the wedge block 100 would also have to change to align with the angle of the lower surface 76 of the tongue groove 74.

Figure 13:
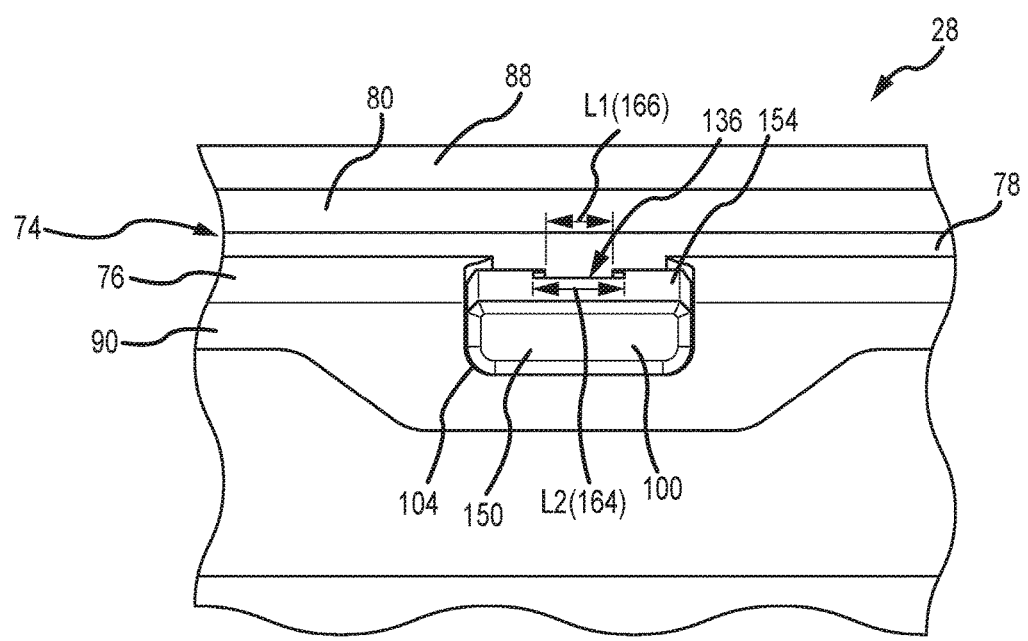
FIG. 13 is an elevation view of the inner portion the wedge block and groove.

FIG. 13 is an elevation view of the inner portion of the clamping joint and wedge block 100 in the absence of a tongue. The view in FIG. 13 is from within the vehicle 20 and looking outward toward the exterior of the vehicle 20 or spacecraft 22. The interior surface of the separation ring 28 is shown, including the tongue groove 74, the upper flange 88 of the tongue groove 74, the lower flange 90 of the tongue groove 74, and the wedge block cutout 104. The groove 74 includes an upper surface 80, a rear surface 78, and a lower surface 76. The wedge block 100 is positioned in the wedge block cutout 104. The inwardly-oriented surface 150 and the upper surface 154 of the wedge block 100 are visible. A portion of the cutout 136 in the wedge block 100 is shown. The thin portion 166 of the cutout 136 has a length L1 and the wide portion 164 of the cutout 136 has a length L2. In one embodiment, the length L1 of the thin portion 166 of the cutout 136 is between about 0.100 inches and about 0.75 inches. In a preferred embodiment, the length L1 of the thin portion 166 is between about 0.200 inches and about 0.500 inches. In a more preferred embodiment, the length L1 of the thin portion 166 is about 0.300 inches. In one embodiment, the length L2 of the wide portion 164 of the cutout 136 is between about 0.100 inches and about 0.75 inches. In a preferred embodiment, the length L2 of the wide portion 164 is between about 0.250 inches and about 0.550 inches. In a more preferred embodiment, the length L2 of the wide portion 164 is about 0.405 inches. These dimensions are constrained by the size and loads of the specific LVA design. Thus, the design could be scaled up or down in size depending upon the size and load requirements of launch vehicle.

Fastening devices or tightening devices other than bolts 110, 72, 102 can be used in alternative embodiments of the present invention. For example, HI-LOK™ pins could be used rather than bolts 110, 72, 102. In some embodiments, one or more bolts 110, 72, 102 are made of super-alloy MP35N. In various embodiments, an embed, bushing, or insert 120 is used in the bore or hole 138 of the separation ring 28 proximate the wedge block cutout 104. The insert 120 may be any material known in the art, and specifically may be steel, CRES, or A286 CRES. The purpose of the insert 120 is to provide structural attachment of bolt 110 to separation ring 28. The insert 120 also provides the threaded interface for the threaded bolt 110. The insert 120 may be threaded or have an alternative structural engagement to the bolt 110. For example, the insert may be eliminated and each hole tapped directly in the separation ring.

Figure 14:
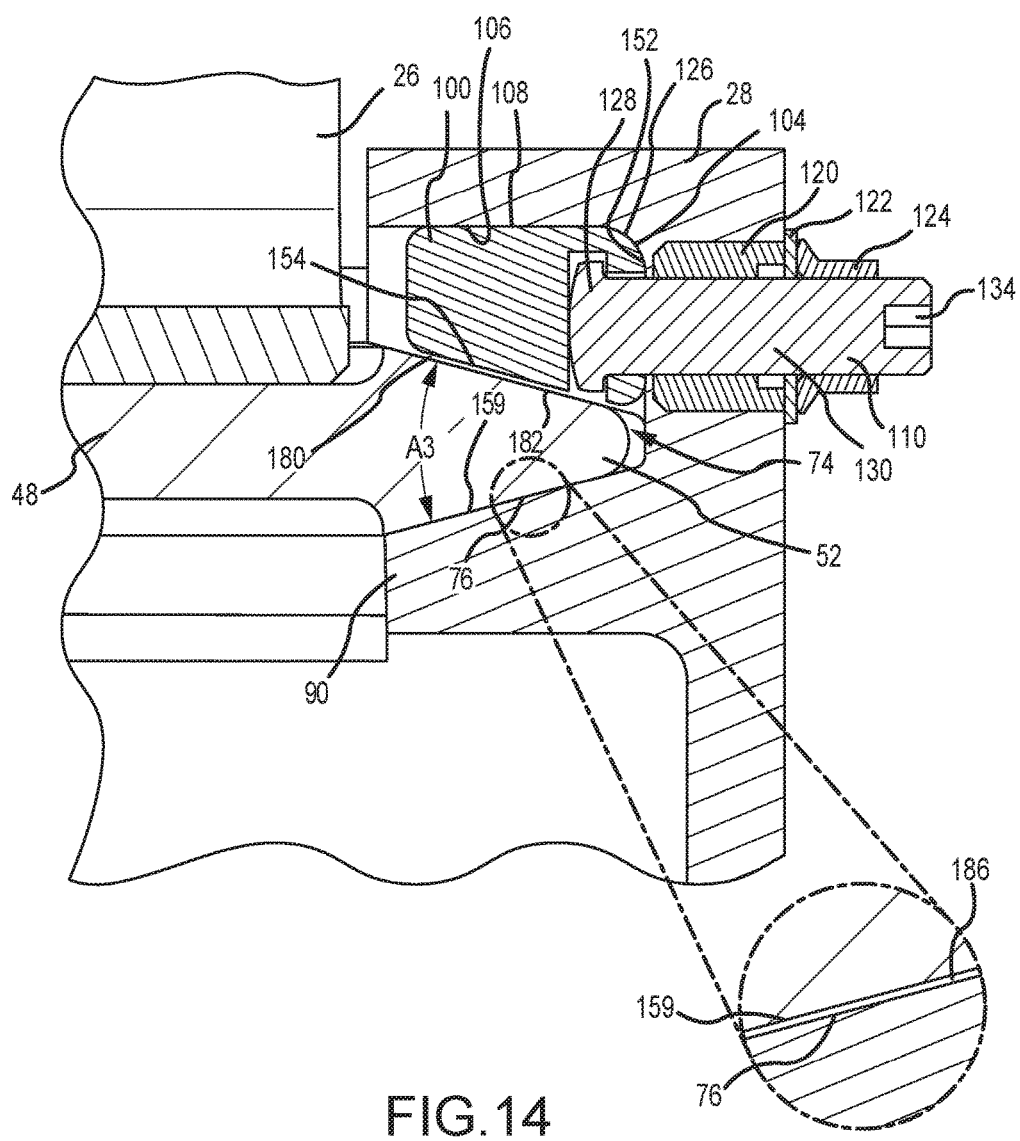
FIG. 14 is an assembled cross-sectional view of an alternate embodiment of the clamping joint.

As shown in FIG. 14, in some embodiments, the wedge blocks 100 and wedge block cutouts 104 may be positioned at an upper or top portion of the tongue groove 74, meaning positioned in the upper flange of the tongue groove 74. Thus, the flange-interfacing surface 106 of the wedge block 100 is positioned adjacent to the upper surface 108 of the wedge block cutout 104 and the wedge block 100 is positioned above the tongue 52 such that the tongue-interfacing surface 154 of the wedge block 100 is positioned adjacent to the upper surface 182 of the tongue 52. Additionally, depending on tolerance and assembly, there may be a gap 186 between the lower surface 159 of the tongue 52 and the lower surface 76 of the tongue groove 74, as is shown in the enlarged portion. The wedge blocks 100 help to remove this gap 186. Also depending on tolerance and assembly, there may be a gap between the upper surface 108 of the wedge block cutout 104 and the lower surface 106 of the wedge block 100. In any complete configuration, both conditions may be present.

In various embodiments, the separation ring 28 can be any known material, including metal, ceramic, plastic, composite material, or other material known in the art. In one embodiment, the separation ring 28 is aluminum or an aluminum alloy. In some embodiments, the separation ring 28 has a coating to reduce corrosion and/or reduce friction (e.g., Teflon®). In various embodiments, the wedge block 100 is a harder material than the separation ring 28. In one embodiment, the wedge block 100 is stainless steel, a high-strength non-metallic material, or A286 CRES. The wedge block may also be coated to reduce corrosion and/or reduce friction, e.g., coated with Teflon®, molybdenum disulfide, dicronite, etc. Alternatively, the wedge block 100 could be rubber or other elastic material.

Various embodiments comprise various numbers of wedge blocks 100. The number of wedge blocks 100 used in any aerospace embodiment is dependent on the diameter of the separation ring 28, the vibration frequency of the fairing, and the loads experienced by the separation ring 28. Alternative embodiments used with other vehicles, pipes, or machines will have different factors that determine the number of wedge blocks 100 required to reduce vibration and/or shock experienced by the system. The goal is to spread the load over all of the wedge blocks 100, where the load includes the vibration and aerodynamic loads, while establishing a zero gap fit at the horizontal separation plane and removing tongue and groove clearances.

In some embodiments, wedge block cutouts and wedge blocks may be positioned on a lower or bottom portion of the tongue groove (as shown in FIGS. 8A-13) while other wedge block cutouts and wedge blocks may be positioned on an upper or top surface of the tongue groove, meaning positioned in the upper flange of the tongue groove (as shown in FIG. 14). In additional or alternative embodiments, two or more wedge blocks can be inserted in each wedge block cutout.

The various embodiments of methods, devices, and systems used to interconnect or join two components under high loads and possible shocks have been described herein in detail. Such interconnection or joint systems and devices are capable of being designed and constructed using other methods and of being practiced or of being carried out in various ways as will be readily understood by those of skill in the art upon review of the present disclosure. Such modifications and alterations of those embodiments as will occur to those skilled in the art upon review of the present disclosure are within the scope and spirit of the claimed invention, as set forth in the following claims. In addition, it is to be understood that the phraseology and terminology used herein is for the purpose of description and should not be regarded as limiting.

What is claimed is:

1. An interconnection apparatus comprising:
   a first component comprising:
      an inner surface;
      an outer surface spaced from the inner surface;
      a first flange having an inner surface and extending from the inner surface of the first component;
      a second flange having an inner surface and extending from the first component in the same direction as the first flange, the second flange aligned with and spaced from the first flange, wherein the inner surface of the first flange and the inner surface of the second flange define a tongue groove;
      a plurality of wedge block cutouts in the first flange, the second flange, or both; and
      an aperture associated with each wedge block cutout and extending from the inner surface of the first component through the outer surface of the first component;
   a second component comprising an outer edge and a tongue portion extending along at least a portion of the outer edge, wherein the tongue portion has a first surface and a second surface oriented at an acute angle relative to the first surface of the tongue portion; and
   a plurality of tensioning apparatuses each comprising:
      a wedge block associated with each wedge block cutout, the wedge block having a first surface and a second surface; and
      a fastening device having a first end and a second end, wherein the first end is connected to the wedge block and the second end extends through the aperture associated with the wedge block cutout in the first component; and
   wherein when the tongue portion is positioned in the tongue groove the first surface of the tongue portion is aligned with the inner surface of the first flange, the second surface of the tongue portion is aligned with the inner surface of the second flange, and when the wedge block cutout is formed in the first flange the first surface of the wedge block is aligned with the first surface of the tongue portion, and when the wedge block cutout is formed in the second flange the first surface of the wedge block is aligned with the second surface of the tongue portion.

2. The interconnection apparatus of claim 1, wherein the first component is a separation ring of a launch vehicle.

3. The interconnection apparatus of claim 2, wherein the second component is at least one of an annular plate, a closeout section, a launch vehicle adapter, payload adapter, spacecraft, and a payload.

4. The interconnection apparatus of claim 1, wherein the fastening device of the tensioning apparatus is a bolt, and wherein the bolt comprises a first end, a second end opposite the first end, and a body portion positioned between the first end and the second end, and wherein the first end of the bolt is attached to the wedge block.

5. The interconnection apparatus of claim 1, wherein the second component is a circular plate and the tongue portion extends from at least portions of an outer edge of the circular plate.

6. The interconnection apparatus of claim 1, wherein the tongue portion has cutouts to receive positioning bolts.

7. The interconnection apparatus of claim 1, wherein the tongue groove has an angle of between about 25 degrees and about 35 degrees and the acute angle of the tongue portion is between about 25 degrees and about 35 degrees.

8. The interconnection apparatus of claim 2, further comprising a fairing attached to the first component.

9. The interconnection apparatus of claim 1, wherein when the interconnection apparatus is in a final interconnected position the first surface of the wedge block is in direct contact with the second surface of the tongue portion.

10. A system for releasably interconnecting multiple components, comprising:
    a ring comprising:
       a first flange extending inwardly around at least a portion of the ring;
       a second flange extending inwardly around at least a portion of the ring and spaced from the first flange to define a groove between the first and second flanges; and
       a plurality of wedge block cutouts in the first flange, second flange, or in both the first and second flanges and spaced around at least a portion of the ring;
    a plate having a circular perimeter and a tongue portion extending around at least a portion of the perimeter, wherein the tongue portion has an upper surface and a lower surface oriented at an acute angle relative to the upper surface; and
    a plurality of tensioning apparatuses, wherein at least one tensioning apparatus is positioned in each wedge block cutout, each tensioning apparatus comprising:
       a wedge block; and
       a fastening device having a first end and a second end, wherein the first end is positioned in the wedge block and the second end extends through the ring; and
    wherein the position of the wedge block is adjustable from an exterior of the ring.

11. The system for interconnecting multiple components of claim 10, wherein the fastening device is configured to move a wedge block radially inward relative to the ring to clamp at least a portion of the tongue portion between a surface of the wedge block and a portion of the first flange.

12. The system for interconnecting multiple components of claim 10, wherein the ring is a separation ring of a launch vehicle.

13. The system for interconnecting two components of claim 10, wherein the fastening device comprises a bolt and a nut, wherein the bolt comprises a first end, the first end interconnected to the wedge block, a second end opposite the first end, and a body portion positioned between the first end and the second end, the body portion extending through the ring such that the second end of the bolt is on an opposite side of the ring from the first end of the bolt, and wherein the nut is interconnected to the second end of the bolt.

14. The system for interconnecting multiple components of claim 10, wherein the groove has an angle of between about 25 degrees and about 35 degrees and the acute angle of the tongue portion is between about 25 degrees and about 35 degrees.

15. A method for interconnecting two components, comprising:
    providing:
        a first component comprising an inner surface and an outer surface, a tongue groove and a wedge block groove extending from the inner surface, wherein the tongue groove defines a first acute angle and the wedge block groove defines a second acute angle different from the first acute angle;
        a second component having a first edge, the first edge comprising a first surface and a second surface that define a tongue, wherein the second surface is oriented relative to the first surface at a third acute angle, and wherein the first and third acute angles are substantially the same;
        a wedge block comprising a first surface and a second surface spaced from the first surface, wherein the first surface is oriented at a fourth acute angle relative to the second surface; and
        a fastening device;
    positioning the wedge block in the wedge block groove;
    positioning the fastening device such that it is interconnected with the wedge block and accessible from the outer surface of the first component;
    inserting the tongue into the tongue groove;
    inserting the tongue into the wedge block groove such that the first surface of the wedge block is proximate the second surface of the tongue; and
    repositioning the wedge block laterally away from the inner surface of the first component.

16. The method for interconnecting two components of claim 15, wherein repositioning the wedge block comprises sliding the second surface of the wedge block along a surface of the wedge block groove.

17. The method for interconnecting two components of claim 15, wherein repositioning the wedge block comprises removing a first gap between the second surface of the tongue and the first surface of the wedge block.

18. The method for interconnecting two components of claim 17, wherein repositioning the wedge block comprises removing a second gap between the first surface of the tongue and a surface of the tongue groove.

19. The method for interconnecting two components of claim 15, wherein repositioning the wedge block comprises removing a gap between at least one of:
    the second surface of the tongue and the first surface of the wedge block,
    the first surface of the tongue and a surface of the tongue groove, and
    the second surface of the wedge block and a surface of the wedge block groove.

20. The method for interconnecting two components of claim 15, wherein the first component is semicircular and the fastening device applies radial pressure on the wedge block.

21. The method for interconnecting two components of claim 19, wherein repositioning the wedge block comprising adjusting the fastening device from the outer surface of the first component.

* * * * *